United States Patent
Hedayat et al.

(10) Patent No.: US 9,960,824 B2
(45) Date of Patent: May 1, 2018

(54) HIGH-EFFICIENCY (HE) SOUNDING METHODS FOR MIMO AND OFDMA

(71) Applicant: NEWRACOM, Inc., Irvine, CA (US)

(72) Inventors: Ahmad Reza Hedayat, Aliso Viejo, CA (US); Young Hoon Kwon, Laguna Niguel, CA (US); Daewon Lee, Irvine, CA (US)

(73) Assignee: NEWRACOM, Inc., Irvine, CA (US)

( * ) Notice: Subject to any disclaimer, the term of this patent is extended or adjusted under 35 U.S.C. 154(b) by 155 days.

(21) Appl. No.: 15/019,918

(22) Filed: Feb. 9, 2016

(65) Prior Publication Data

US 2016/0233932 A1 Aug. 11, 2016

Related U.S. Application Data

(60) Provisional application No. 62/113,953, filed on Feb. 9, 2015.

(51) Int. Cl.
| | |
|---|---|
| *H04W 4/00* | (2009.01) |
| *H04B 7/04* | (2017.01) |
| *H04L 5/00* | (2006.01) |
| *H04B 7/0452* | (2017.01) |
| *H04W 72/04* | (2009.01) |
| *H04W 16/28* | (2009.01) |

(52) U.S. Cl.
CPC ......... *H04B 7/0421* (2013.01); *H04B 7/0452* (2013.01); *H04L 5/0048* (2013.01); *H04L 5/0023* (2013.01); *H04W 16/28* (2013.01); *H04W 72/046* (2013.01)

(58) Field of Classification Search
CPC ... H04B 7/0421; H04B 7/0452; H04L 5/0048; H04L 5/0023; H04W 16/28; H04W 72/046
USPC ........................................................ 370/329
See application file for complete search history.

(56) References Cited

U.S. PATENT DOCUMENTS

| | | | | |
|---|---|---|---|---|
| 2007/0230373 | A1* | 10/2007 | Li ........................ | H04B 7/0447 370/267 |
| 2007/0298742 | A1* | 12/2007 | Ketchum ............. | H04B 7/0617 455/186.1 |
| 2014/0233551 | A1* | 8/2014 | Wentink ............... | H04L 1/1621 370/338 |

(Continued)

OTHER PUBLICATIONS

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

(Continued)

*Primary Examiner* — Peter Cheng
(74) *Attorney, Agent, or Firm* — NDWE LLP

(57) ABSTRACT

A process and system provides a high efficiency (HE) sounding procedure that enables a beamformer to signal to each beamformee support for responses allowing other forms of feedback from the beamformee instead of explicit feedback. The HE sounding procedure utilizes additional fields in the frames of the HE sounding procedure to signal the use of the HE sounding procedure. The HE sounding procedure also supports legacy stations that provide standard explicit feedback.

16 Claims, 13 Drawing Sheets

(56) References Cited

U.S. PATENT DOCUMENTS

2016/0134342 A1* 5/2016 Kneckt ............... H04B 7/0452
375/267
2016/0197655 A1* 7/2016 Lee ....................... H04B 7/024
370/338

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

* cited by examiner

| Field | Description |
|---|---|
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) |

HIGH-EFFICIENCY (HE) SOUNDING METHODS FOR MIMO AND OFDMA

CROSS-REFERENCE TO RELATED APPLICATIONS

This application claims the benefit of U.S. Provisional Application No. 62/113,953, filed Feb. 9, 2015, which is hereby incorporated by reference.

FIELD OF INVENTION

The embodiments of the invention are related to the field of wireless local area network (WLAN) operation. More specifically, the embodiments of the invention relate to a method and system for improving the efficiency in sounding procedures while supporting legacy WLAN devices and procedures.

BACKGROUND

Institute of Electrical and Electronics Engineers (IEEE) 802.11 is a set of physical and media access control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

IEEE 802.11 defines a data frame exchange process that enables the devices, referred to as stations and access points, to negotiate the timing of the exchange of data between devices over the various shared channels of the 2.4 GHz and 5 GHz bands. As used herein an access point (AP) is a particular type of station, however, station (STA) is generally used to refer to non-AP stations for clarity. The data frame exchanges could be performed with single-antenna transmission or multiple-antenna transmission (also referred to as multiple-input multiple-output or MIMO). That is each of the stations or access points in the WLAN may include and utilize a single antenna or multiple antennas. In the case of multiple-antenna or MIMO transmission, multiple spatial streams (SS) are sent within the same frame from one station or access point, which usually is called a beamformer (BFer), to another station or access point, which is usually called a beamformee (BFee), and this type of transmission is called beamforming (BF), or MIMO. BF and MIMO transmissions are usually enhanced by some initial frame exchanges so that the BFer knows about the MIMO channel condition of the BFee. This initial exchange of frames before the actual data frame exchange is called a sounding procedure. The frames that might be used in a sounding procedure are the high throughput (HT) and very high throughput (VHT) null data packet (NDP) frame, VHT MIMO Compressed Beamforming Report frame, VHT NDP Announcement (NDPA) frame, and VHT Beamforming Report Poll frame. Each of these frames may have various fields and subfields such as: VHT MIMO Control, VHT Compressed Beamforming Report, MU Exclusive Beamforming Report, Sounding Dialog Token, STA Info, and similar fields that are utilized for exchanging information relevant to beamforming.

SUMMARY

The embodiments include a method that is implemented by a network device functioning as a station in a wireless local area network (WLAN). The method improves efficiency for beamforming for multiple antenna array communications where a steering matrix or compressed beamforming report is determined by the station acting as a beamformer. The method uses implicit feedback from at least one station acting as a beamformee. In contrast, explicit feedback is considered channel characteristics calculated and provided by the beamformee. Implicit feedback is considered channel characteristics calculated by the beamformer using a response frame from the beamformee. The steering matrix determines a spatial path for transmission from the beamformer to each beamformee in the WLAN. The method generates a sounding frame to initiate a sounding feedback sequence. The sounding frame includes an indicator to request a response frame from a first station to enable the beamformer to compute a steering matrix or a compressed beamforming report. The network device sends the sounding frame to a set of stations in the WLAN, including the first station.

The embodiments further include another method implemented by another network device functioning as a station in the WLAN. This method is a complement to the first method. The method receives the sounding frame that initiates a sounding feedback sequence from the station acting as the beamformer. The first sounding frame includes an indicator to request a first response frame from which the beamformer can derive a steering matrix or a compressed beamforming report. The method further accesses the indicator to determine a type of the first response frame, generates the first response frame indicated by the indicator in the first sounding frame, and sending the response frame to the station acting as the beamformer.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
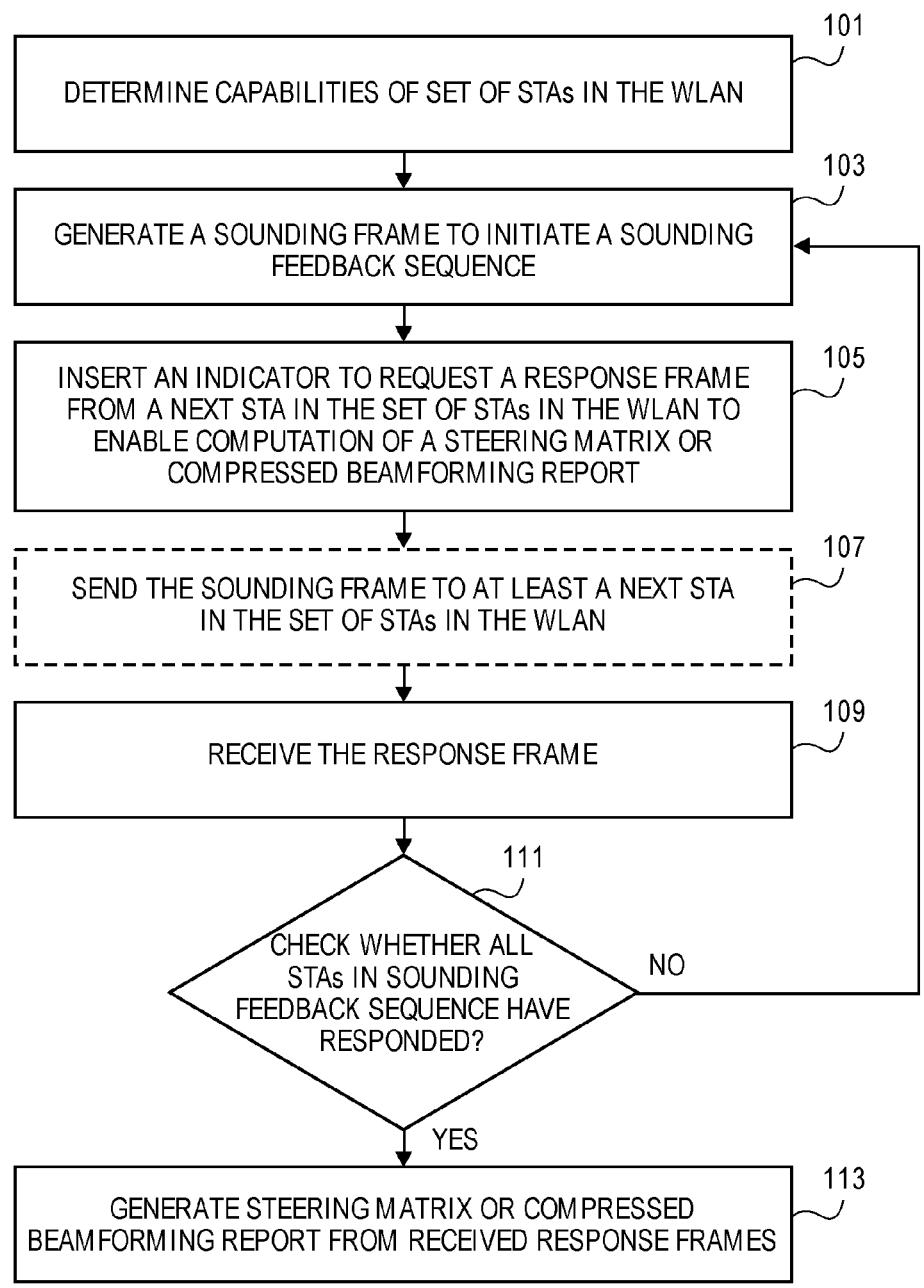
FIG. 1 is a diagram of one embodiment of the high efficiency (HE) sounding procedure as implemented by the access point or beamformer.

The embodiments provide a method and system for a high efficiency (HE) sounding procedure implemented by a set of stations in a wireless communication system such as a wireless local area network (WLAN) implementing IEEE 802.11. The method is a sounding procedures that can be used in single-user (SU) and multiple-user (MU) MIMO transmissions such that a station (STA) or access point (AP) acting as a beamformer can acquire enough knowledge about the channel shared with each of the stations or APs that it is communicating with (i.e., the beamformees). The beamformer can then calculate beamforming vectors or matrices for use in subsequent transmissions with multiple spatial streams or multiple-user transmissions. In the embodiments, the HE sounding procedure is introduced where new fields and subfields are introduced. The newly introduced fields and subfields are prefixed with HE (that stands for high-efficiency WLAN or IEEE 802.11ax), some of these newly introduced fields are utilized within previously defined very high throughput (VHT) frames. In the embodiments, a sounding procedure for IEEE 802.11ax stations or similar high efficiency (HE) clients is proposed that enhances the efficiency of the sounding procedure while maintaining support for interacting with both legacy devices such as VHT beamformees as well as HE beamformees.

With the introduction of orthogonal frequency division multiple access (OFDMA) in WLAN and IEEE 802.11ax, there are additional benefits that an access point or station can acquire from the sounding procedure before it performs downlink (DL) or uplink (UL) OFDMA. While there are benefits derived from sounding procedures, there are overhead concerns as well since they could rely on the transmission of lengthy frames. Typically, long frames are sent by beamformees as a result of a sounding request that requires each beamformee to send back a feedback matrix to the beamformer. The overhead can become large if the sounding is performed for a larger bandwidth, more frequency selective wireless channels, and if beamformees choose to send the sounding reports with low modulation coding scheme (MCS) or specific duplicated formats. Such overhead usually makes the transmission techniques that require sounding (SU MIMO, MU MIMO, and DL/UL OFDMA) to be efficient only for large payloads.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include stations and access points in wireless communications systems such as wireless local area network (WLAN). Stations are devices connected to and communicating in a WLAN including client or user devices that connect to the WLAN via access points. Access points are network devices that may be specialized wireless access points that can communicate with other network devices in the WLAN via the wireless medium or via wired connections.

Data frame exchange amongst stations in WLAN IEEE 802.11ax and similar technologies can involve single and multiple antenna (i.e., MIMO) transmission schemes. The embodiments provide an efficient sounding procedure to enable computation of a steering matrix or compressed beamforming report for transmissions between an access point (AP), the beamformer (BFer), and a set of stations, beamformees (BFees). The sounding procedure involves the initial exchange of frames such that the BFer can discern the channel conditions of the BFees. The frames that might be used in the sounding procedure are the HT and VHT NDP frames, VHT MIMO Compressed Beamforming Report frame, VHT NDP Announcement (NDPA) frame, and VHT Beamforming Report Poll frame. Each of these frames might have various fields and subfields that are modified for use in the embodiments to improve the efficiency of the sounding procedure, including the VHT MIMO Control, VHT Compressed Beamforming Report, MU Exclusive Beamforming Report, Sounding Dialog Token, STA Info, and similar fields and sub-fields. As mentioned, in the embodiments, newly introduced fields and subfields are prefixed with HE (that stands for high-efficiency WLAN or IEEE 802.11ax).

Transmit beamforming and DL-MU-MIMO require knowledge of the channel state to compute the steering matrix or compressed beamforming report that is applied to the transmitted signal to optimize reception at one or more receivers (i.e., at the BFees). In the embodiments, the AP transmitting, using the steering matrix or compressed beamforming report derived from the improved HE sounding procedure, is called the VHT beamformer or HE beamformer and a STA for which reception is optimized is called a VHT beamformee or HE beamformee. In the embodiments, an explicit feedback mechanism may be used where the VHT beamformee directly measures the channel from the training symbols transmitted by the VHT beamformer and sends back a transformed estimate of the channel state to the VHT beamformer. The VHT beamformer then uses this estimate, in some embodiments combining estimates from multiple VHT beamformees, to derive the steering matrix or compressed beamforming report. In other embodiments, where HE STAs are present, a hybrid feedback mechanism, that allows both implicit and explicit sounding, may be used where the VHT beamformee directly measures the channel from the training symbols transmitted by the VHT beamformer and sends back a transformed estimate of the channel state to the VHT or HE beamformer, and the HE beamformee does not directly measure the channel from the training symbols that may be transmitted by the HE beamformer. Instead the HE beamformee sends training symbols to the HE beamformer, which allows the HE beamformer to estimate the channel state between the HE beamformer and HE beamformee. The HE beamformer then uses these estimates, in some embodiments combining estimates from multiple VHT or HE beamformees, to derive the steering matrix or compressed beamforming report.

Figure 2:
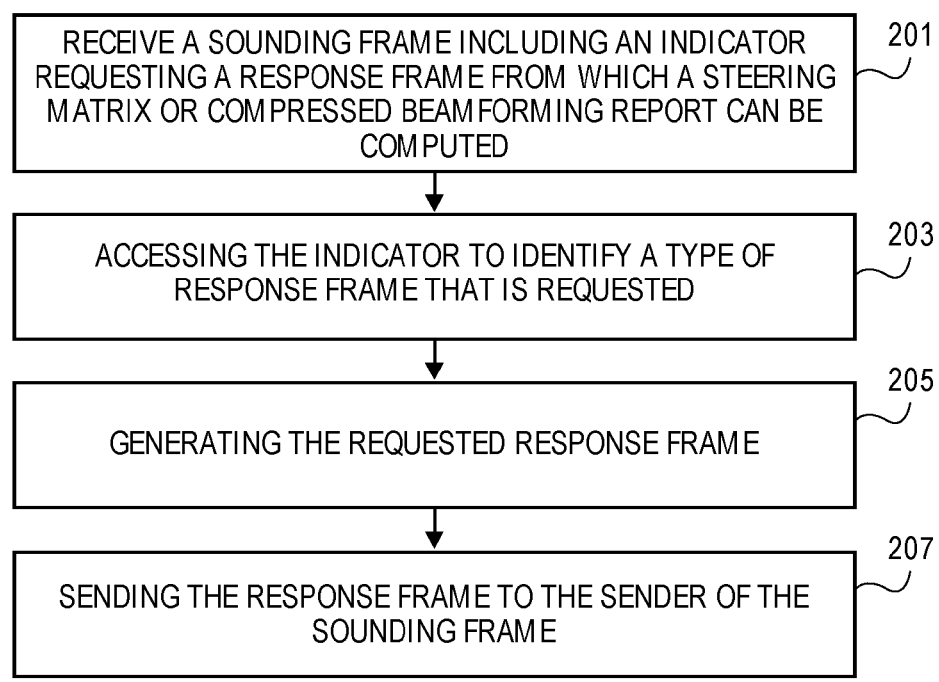
FIG. 2 is a diagram of one embodiment of the HE sounding procedure as implemented by a station or beamformees.

The overall process is described in relation to FIGS. 1 and 2. These figures describe the process at a high level. Specific implementation examples and cases are provided with regard to HE sounding and VHT sounding procedures and hybrids thereof herein below after the high level overview. In prior systems, such as IEEE 802.11ac, the sounding procedure consisted of four major steps: first the beamformer begins the process by transmitting a null data packet (NDP) announcement (NDPA) frame, which is used to gain control of the channel, describes some overall properties of the sounding procedure, and identifies beamformees and their order. Beamformees will respond to the NDPA, while all other stations will defer channel access until the sounding sequence is complete. Second, the beamformer follows the NDPA with a NDP. The NDP is sent so that the beamformee can analyze the OFDM training fields in the NDP to calculate the channel characteristics, to be utilized in the steering matrix or compressed beamforming report. For multi-user transmissions, an NDP is sent to the first STA followed by BF Report Poll frames that are sent to each additional STA, one for each STA. Third, the beamformee analyzes the training fields in the received NDP and calculates a feedback matrix that describes the characteristics of the channel. Fourth, the beamformee sends the feedback matrix back to the beamformer (this is referred to as explicit feedback) and the beamformer receives the feedback matrix and calculates the steering matrix or compressed beamforming report to direct transmissions toward the beamformee. Where there are multiple STAs the feedback matrices are combined to form the steering matrix or compressed beamforming report.

The embodiments of the HE sounding procedure shift responsibility to the AP to compute the characteristics of the channels in communicating with each of the STAs by use of implicit feedback rather than explicit feedback, which requires the STAs to determine the characteristics of the communication channel. The explicit feedback procedure relies on longer frames that convey feedback from each of the STAs in the form of a feedback matrix, whereas the HE sounding procedure defined herein relies on shorter frames as responses from the STAs, such as NDP frames. However, the process still supports legacy devices that are not capable of using the HE sounding procedure. Thus, the AP first determines the identities and capabilities of each of the STAs in the WLAN before engaging in the HE sounding procedure.

FIG. 1 is a diagram of one embodiment of the HE sounding procedure as implemented by the AP. In one embodiment, the process is implemented by the AP that is determining a steering matrix or compressed beamforming report for SU or MU MIMO with each of the STAs in a WLAN. As mentioned, the process determines the capabilities of each STA in the set of STAs in the WLAN or that are part of the HE sounding procedure (Block 101). This information can be conveyed in initial communications with each of these STAs and includes information about the identity and in some cases the capabilities for each of the STAs to communicate with regard to SU or MU MIMO and similar capabilities. The STAs can identify themselves via station identifiers, addresses or similar information. The process then continues by generating a frame at the AP to initiate the HE sounding procedure (Block 103). In some embodiments, the frame is an NDP announcement (NDPA) frame. The NDPA frame can include information identifying each of the STAs that are to participate in the sounding feedback procedure. In the embodiments, the frame can also include additional information to communicate to the STAs that the HE sounding procedure can be or must be utilized (Block 105). This indicator can be specific to the next STA that is to respond with feedback in the sounding feedback sequence, if there is more than one STA. Depending on the knowledge of the STAs capabilities the AP can specify that the STA does not need to provide an explicit feedback in its response (i.e., a compressed feedback report frame), instead implicit feedback will be derived from the response by the STA (i.e., an NDP frame). In some embodiments, the indicator is an NDP Response Allowed or NDP Response Required field that is set to true (i.e., 1). The STAs should provide a response frame without explicit feedback if they support the HE sounding procedure. If it is known that all or some of the STAs support the feature, then in some embodiments, an indicator requiring an HE sounding procedure response be provided can be included in the NDPA. This process will vary dependent of whether the communication is SU or MU MIMO as discussed further herein below.

Once the frame has been generated and the indicator inserted, then the frame can be sent to the next (or all) of the STAs in the WLAN communicating on a given channel (Block 107). In some embodiments, the initial frame sent may be the NDPA and it may identify each of the STAs to take place in the HE sounding procedure. A subsequent frame such as an NDP frame may be sent on the channel to elicit a response from the first STA (where there is more than one) on the list of identified STAs (Block 109).

The AP then receives the sounding feedback sequence response frame from the first STA (Block 111). This sounding feedback sequence response frame will depend on the capabilities of the first STA. If the first STA supported the HE sounding procedure, then it can return a shorter message without a feedback matrix such as an NDP frame. However, if the first STA did not support implicit feedback, then a longer message is returned such as a VHT compressed BF report or similar message with explicit feedback about the characteristics of the channel. The AP analyzes the feedback whether explicit or derived implicit feedback and utilizes the information to form or update the steering matrix or compressed beamforming report. In other embodiments, the update and calculation of the steering matrix or compressed beamforming report may be performed after the completion of the sounding feedback sequence. Where implicit feedback is derived from the response frame then the OFDM training symbols in the frame may be analyzed to determine the characteristics of the channel. The AP also checks whether all STAs in the sounding feedback sequence have responded (Block 113). If all of the STAs have not responded then the process can continue by generating another frame to be communicated on the channel to elicit the feedback or response frame of the next STA.

After the first STA has been contacted, then the subsequent STA in this MU MIMO scenario may be sent a BF Report Poll frame or similar message (Block 103). Just as with the initial frame (i.e., an NDPA) that is generated and sent, the subsequent frames (i.e., BF Report Poll frames) will include an indicator to request a sounding feedback response frame from the next STA in the set of STAs in the WLAN. The indicator may be the NDP Response Allowed or NDP Response Required field with a value set to true (i.e., 1). The same fields and subfields or alternatively and subset thereof may be defined in the BF Report Poll frame as are defined for the NDPA or any similar frame that is initially sent. The procedure iterates until all of the STAs have responded to the sounding feedback sequence. In subsequent iterations, where a BF Report Poll frame is sent instead of an NDPA, the sending of a NDP is not carried out. In other words, the first iteration may involve the sending of the NDPA and NDP, whereas subsequent iterations sends the BF Report Poll frame to communicate the type of feedback that is allowed or required from each STA. In the first iteration where the NDPA is sent, the NDPA may be sent to multiple STAs, whereas the subsequent BF Report Poll frames are sent to single STAs.

FIG. 2 is a diagram of one embodiment of the HE sounding procedure implemented by the beamformee. The embodiments of the procedure mirror that of the AP. In the embodiments, the HE sounding procedure, as it is implemented at the beamformees, responds to receiving a frame from the AP over a wireless medium, specifically, a channel of the wireless medium (Block 201). The beamformee is a STA that has been identified by the AP in the received frame. In some embodiments, the received frame is one of a set of frames that are transmitted by the AP that can include frames that are addressed to all of the STAs and frames that are addressed to individual STAs. The received frame may be an NDPA that includes the station list identifying the receiving STA that is implementing the procedure, and in some cases a subsequent NDP. Other STAs that are not identified in the NDPA frame would ignore the HE sounding procedure and remain idle on the channel until completed. The received frame can also be a BF Report Poll frame where the STA is not the first to respond.

The received frame is analyzed to identify a type of the sounding feedback sequence response frame that is requested (Block 203). The received frame may include an indicator allowing, requesting or requiring a response frame from which implicit feedback is derived. In one example situation, the implementing STA does support deriving implicit feedback by the AP and generates a response frame in the form of an NDP (e.g., an HE or VHT NDP). The generated feedback response frame is then sent back to the AP that sent the request frame (Block 207). In the example described above in which the STA transmits a NDP frame in response to the AP, the STA does not need to implement any analysis of the received frame to provide a feedback matrix and only a relatively short NDP frame is sent in return, in contrast to sending a VHT compressed BF report that includes a feedback matrix or similar frame.

The STAs in the WLAN may have differing capabilities and in some cases may be legacy devices that do not support implicit feedback, or HE devices that for some reason are implemented to support explicit feedback or are preferred by the beamformer to send explicit feedback. In some embodiments, multiple types of implicit feedback procedures may exist. The below example embodiments discuss the parameters of an HE sounding procedure alone and in combination with elements of the VHT sounding protocol. In some example embodiments, the configuration information within STAs or configuration information exchanged between the STAs can indicate support for and the STAs role in the HE sounding procedure. A set of example fields and elements for tracking the role and operation of the STAs is discussed below.

The embodiments described herein can utilize a number of new fields and subfields to enable the BFer and BFee to implement the sounding feedback sequence.

Figure 3A:
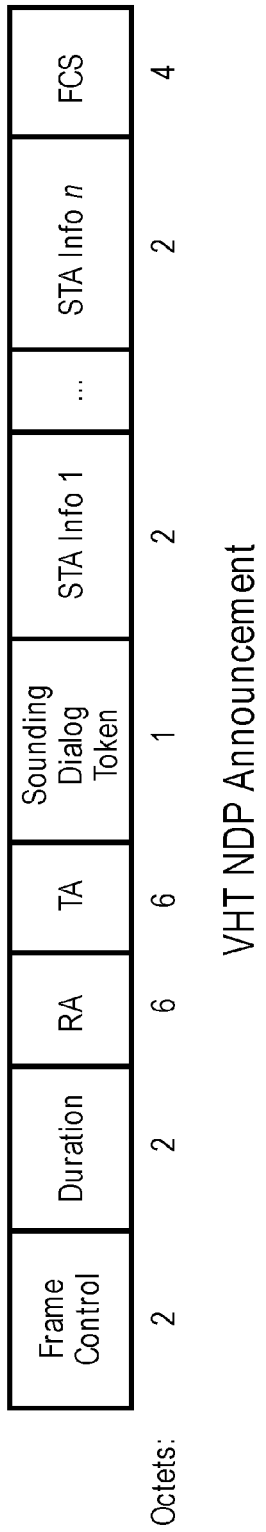
FIG. 3A is a diagram of the frame format of the VHT NDP Announcement frame.

FIG. 3A is a diagram of the frame format of the VHT NDP Announcement frame. The VHT NDP Announcement frame contains at least one STA Info field. If the VHT NDP Announcement frame contains only one STA Info field, then the receiver address (RA) field value is the address of the STA identified by the AID in the STA Info field. If the VHT NDP Announcement frame contains more than one STA Info field, then the RA field value is the broadcast address. The transmitter address (TA) field value is the address of the STA transmitting the VHT NDP Announcement frame or a bandwidth signaling TA. In a VHT NDP Announcement frame transmitted by a VHT STA in a non-HT or non-HT duplicate format and where the scrambling sequence carries the TXVECTOR parameter CH_BANDWIDTH_IN_NON_HT, the TA field value is a bandwidth signaling TA.

Figure 3B:
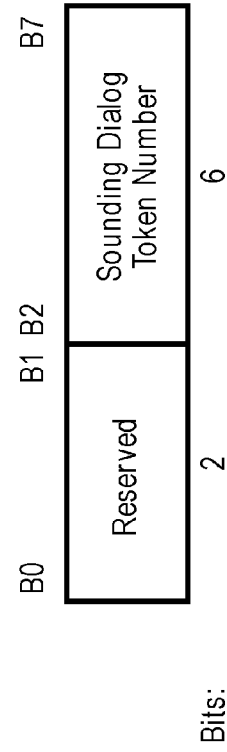
FIG. 3B is a diagram of the format of the Sounding Dialog Token field.

FIG. 3B is a diagram of the format of the Sounding Dialog Token field. This field is used in the VHT Sounding procedure, and in particular in frames such as VHT NDP Announcement and VHT Compressed Beamforming Report. The Sounding Dialog Token Number subfield in the Sounding Dialog Token field contains a value selected by the beamformer to identify the VHT NDP Announcement frame.

The format of the Sounding Dialog Token field used in HE Sounding procedure, and frames such as HE NDP Announcement, is shown in Table 1. The Sounding Dialog Token Number subfield in the Sounding Dialog Token field contains a value selected by the beamformer to identify the HE NDP Announcement frame. The Sounding Dialog Token field has two additional subfields: NDP Response Allowed and NDP Response Required.

In some embodiments, the NDP Response Allowed field is interpreted such that if it is set to 1, then all the beamformees listed in the preceding VHT NDPA or HT NDPA shall respond with VHT NDP, HE NDP or VHT Compressed BF Report. The value 0 for this subfield is reserved. When NDP Required Allowed subfield is not reserved this field is reserved (and set to 0).

TABLE 1

HE Sounding Dialog Token

| Bit positions | Name of subfield | Definition |
| --- | --- | --- |
| B0 | NDP Response Allowed | In some embodiments proposed herein, this bit is interpreted as follows: If it is set to 1, then all the beamformees listed in the preceding VHT NDPA or HT NDPA shall respond with VHT NDP, HE NDP or VHT Compressed BF Report. The value 0 for this subfield is reserved. When NDP Required Allowed subfield is not reserved this field is reserved (and set to 0). |
| B1 | NDP Response Required | In some embodiments proposed herein NDP Response Required is reserved (and it is set to 0). In some embodiments proposed herein NDP Response Required is interpreted as follows: if it is set to 1 then all the beamformees listed in the preceding VHT NDPA or HT NDPA shall respond with VHT NDP or HE NDP. |
| B2-B7 | Sounding Dialog Token Number | As described in 802.11 specification |

In some embodiments, the NDP Response Required is reserved (and it is set to 0). In other embodiments, the NDP Response Required is interpreted such that if it is set to true (i.e., 1) then all the beamformees listed in the preceding VHT NDPA or HT NDPA shall respond with VHT NDP or HE NDP. When in a HE NDP Announcement frame, the subfield NDP Response Required is set to true (i.e., 1), the subfield NDP Response Allowed is reserved. When in a HE NDP Announcement frame the subfield NDP Response Allowed is set to true (i.e., 1), the subfield NDP Response Required is reserved.

Figure 3C:
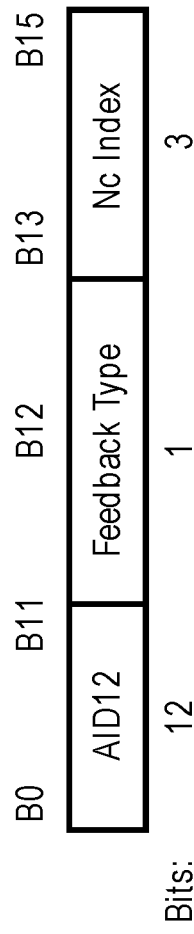
FIG. 3C is a diagram of the format of the STA Info field.

FIG. 3C is a diagram of the format of the STA Info field. The STA info field includes an AID, feedback type and NcIndex. The AID is an identity of the STA, the feedback type indicates whether the STA is providing feedback in SU or MU MIMO. If the Feedback Type field indicates MU, then NcIndex indicates the number of columns, Nc, in the Compressed Beamforming Feedback Matrix subfield minus 1, and it is reserved if the Feedback Type field indicates SU.

Figure 3D:
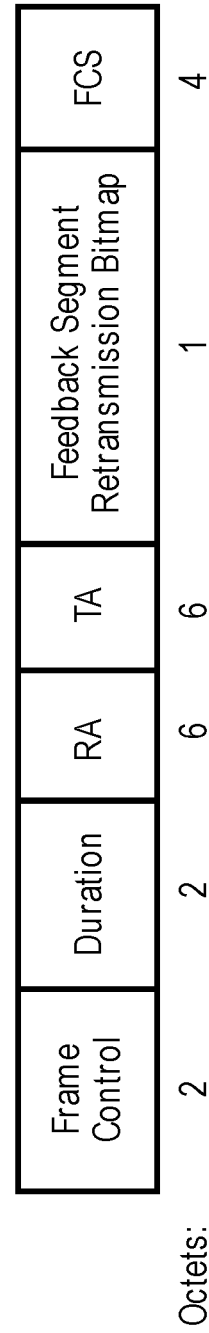
FIG. 3D is a diagram of the format of the VHT Beamforming Report Poll frame.

FIG. 3D is a diagram of the format of the VHT Beamforming Report Poll frame. The HE Beamforming Report Poll frame is shown in Table 2. The setting of the common fields in the Beamforming Report Poll frame and HE Beamforming Report Poll frame are the same unless otherwise noted.

TABLE 2

HE Beamforming Report Poll

| Number of octets | Name of field | Definition and setting |
| --- | --- | --- |
| 2 | Frame Control | As described in 802.11 specification |
| 3 | Duration | As described in 802.11 specification |
| 6 | RA | As described in 802.11 specification |
| 6 | TA | As described in 802.11 specification |
| 1 | Feedback Segment Retransmission Bitmap | The Feedback Segment Retransmission Bitmap field indicates the requested feedback segments of a VHT Compressed Beamforming report. If the bit in position n (n = 0 for LSB and n = 7 for MSB) is 1 then the feedback segment with the Remaining Feedback Segments subfield in the VHT MIMO Control field equal to n is requested. If the bit in position n is 0 |

TABLE 2-continued

HE Beamforming Report Poll

| Number of octets | Name of field | Definition and setting |
|---|---|---|
| | | then the feedback segment with the Remaining Feedback Segments subfield in the VHT MIMO Control field equal to n is not requested. If NDP Response Required has non-zero value, the field is reserved. |
| 1 | NDP Response Required | If NDP Response Required is set to value 1 it indicates that the HE beamformee shall respond with a HE NDP or VHT NDP frame. In some embodiments of this invention this subfield is interpreted as follows: if NDP Response Required is set to 1 it indicates that the HE beamformee shall respond with VHT NDP and if it is set to 2 it indicates that the HE beamformee shall respond with HE NDP. Other values are reserved. |

The TA field value is the address of the STA transmitting the Beamforming Report Poll or a bandwidth signaling TA. In a Beamforming Report Poll frame transmitted by a VHT STA in a non-HT or non-HT duplicate format and where the scrambling sequence carries the TXVECTOR parameter CH_BANDWIDTH_IN_NON_HT, the TA field value is a bandwidth signaling TA. The Feedback Segment Retransmission Bitmap field indicates the requested feedback segments of a VHT Compressed Beamforming report. If the bit in position n (n=0 for LSB and n=7 for MSB) is 1 then the feedback segment with the Remaining Feedback Segments subfield in the VHT MIMO Control field equal to n is requested. If the bit is in position n is 0 then the feedback segment with the Remaining Feedback Segments subfield in the VHT MIMO Control field equal to n is not requested. In HE Beamforming Report Poll frame, if NDP Response Required has non-zero value, the Feedback Segment Retransmission Bitmap field is reserved.

The NDP Response Required subfield in HE Beamforming Report Poll is set such that if the NDP Response Required is set to value 1 it indicates that the HE beamformee shall respond with a HE NDP or VHT NDP frame. Other values for NDP Response Required subfield are reserved. In some embodiments, this subfield is interpreted such that if NDP Response Required is set to 1 it indicates that the HE beamformee shall respond with VHT NDP and if it is set to 2 it indicates that the HE beamformee shall respond with HE NDP.

In some embodiments, there are additional subfields that may be defined to support the HE sounding feedback sequence. The sounding feedback sequence is based on the capability of each AP and STA in the WLAN. In other words, an AP or STA performs in line with their capabilities which are known from a capability field. If the capability is set, then the capability is utilized, otherwise the capability is not utilized. The capability field can be referred to as the HE capabilities element. There are several fields in this element that specify the capabilities of the device (STA or AP). However, for sake of clarity only the fields and subfields that are related to the relevant aspects of the sounding feedback sequence set forth herein are introduced and described. The following fields are added to support the HE sounding procedure.

SU Implicit Beamformee Capable field (1 bit): Set to 1 if the STA is capable of sending VHT NDP or HE NDP instead of VHT Compressed BF Report frame for SU MIMO transmissions. Otherwise it is set to 0.

MU Implicit Beamformee Capable field (1 bit): Set to 1 if the STA is capable of sending VHT NDP or HE NDP instead of VHT Compressed BF Report frame for MU MIMO transmissions. Otherwise it is set to 0.

SU Implicit Beamformer Capable field (1 bit): Set to 1 if the STA is capable of receiving VHT NDP or HE NDP instead of VHT Compressed BF Report frame for SU MIMO transmissions. Otherwise it is set to 0.

MU Implicit Beamformer Capable field (1 bit): Set to 1 if the STA is capable of receiving VHT NDP or HE NDP instead of VHT Compressed BF Report frame for MU MIMO transmissions. Otherwise it is set to 0.

The structures, processes, fields and subfields described herein above can be utilized to implement various embodiments of the HE sounding procedure and/or VHT sounding protocol embodiments. Example scenarios and permutations thereof of these example implementations are described herein below.

In the HE sounding procedure embodiment, a series of capability elements and fields for single-user (SU) and multi-user (MU) are defined. These elements (e.g., information elements) and fields, discussed herein below, can be maintained in a Management Information Base (MIB) value by each AP and STA. The information can also be exchanged between STAs and the AP during association and re-association processes. A field dot11HESUBeamformerOptionImplemented can indicate support the HE SU beamformer procedure. If this field includes a logical identifier that is true, then a STA sets the SU Beamformer Capable field in the HE Capabilities element to true (e.g., 1) indicating support. Similarly, where the STA is a supporting beamformee the dot11HESUBeamformeeOptionImplemented field is true, then the STA sets the SU Beamformee Capable field in the HE Capabilities element to true (e.g., 1). Multiple-user configuration can be similarly managed. If a field dot11HEMUBeamformerOptionImplemented is true, then a STA sets the MU Beamformer Capable field in the HE Capabilities element to true (e.g., 1). If the dot11HEMUBeamformeeOptionImplemented field is true, then a STA sets the MU Beamformee Capable field in the HE Capabilities element to true (e.g., 1). Further, if the field dot11HEMUBeamformerOptionImplemented is true, then a STA sets dot11HESUBeamformerOptionImplemented to true. If the field dot11HEMUBeamformeeOptionImplemented is true, then a STA sets dot11HESUBeamformeeOptionImplemented to true.

In further examples, support for use of implicit beamforming in a single-user configuration can be identified if a dot11HESUImplicitBFerOptionImplemented is true, then a STA sets the SU Implicit Beamformer Capable field in the HE Capabilities element to true (e.g., 1). If a dot11HESUImplicitBFeeOptionImplemented is true, then a STA sets the SU Implicit Beamformee Capable field in the HE Capabilities element to 1. Similarly, implicit beamforming for a multi-user configuration can be identified if dot11HEMUImplicitBFerOptionImplemented is true, then a STA sets the MU Implicit Beamformer Capable field in the HE Capabilities element to true (e.g., 1). If dot11HEMUImplicitBFeeOptionImplemented is true, then a STA sets the MU Implicit Beamformee Capable field in the HE Capabilities element to (e.g., 1). If dot11HEMUImplicitBFerOptionImplemented is true, then a STA sets dot11HESUImplicitBFerOptionImplemented to true. If dot11HEMUImplicitBFeeOptionImplemented is true, then a STA sets dot11HESUImplicitBFeeOptionImplemented to true.

In reference to these example fields and elements described above, a STA is a HE SU-only beamformer if it sets the SU Beamformer Capable field to true (i.e., 1) but sets the MU Beamformer Capable field to false (i.e., 0) in the transmitted VHT Capabilities elements. In contrast, a STA is an SU-only beamformee if it sets the SU Beamformee Capable field to true (i.e., 1), but sets the MU Beamformee Capable field to false (i.e., 0) in the transmitted VHT Capabilities elements. In this regard if the fields dot11HESUBeamformerOptionImplemented and dot11HESUImplicitBFerOptionImplemented are false, then a STA does not act in the role of a HE beamformer. If dot11HESUBeamformeeOptionImplemented and dot11HESUImplicitBFeeOptionImplemented are false, then a STA does not act in the role of a HE beamformee.

In some example embodiments, the configuration information within STAs or configuration information exchanged between the STAs can indicate support for and the STAs role in the VHT sounding procedure. A set of example fields, rules, and elements for tracking the role and operation of the STAs is discussed below.

An HE beamformer initiates a sounding feedback sequence by transmitting a VHT NDP Announcement or HE NDP Announcement frame followed by a VHT NDP or HE NDP after a short interframe space (SIFS). The HE beamformer includes in the VHT NDP Announcement frame or HE NDP Announcement frame one STA Info field for each VHT beamformee or HE beamformee that is expected to prepare VHT or HE Compressed Beamforming feedback or expected to send a VHT NDP frame or HE NDP frame. The HE beamformer also identifies the VHT beamformee or HE beamformee by including the VHT beamformee's association identifier (AID) in the AID subfield of the STA Info field or by including the HE beamformee's AID in the AID subfield of the STA Info field. The VHT NDP Announcement frame or HE NDP Announcement frame include at least one STA Info field.

A STA that transmits a VHT NDP Announcement frame or a HE NDP Announcement frame to a direct link setup (DLS) or tunneled direct link setup (TDLS) peer STA obtains the AID for the peer STA from the DLS Setup Request, DLS Setup Response, TDLS Setup Request or TDLS Setup Response frame. A VHT beamformer or HE beamformer does not transmit either a VHT NDP Announcement+HTC frame or a HE NDP Announcement+HTC frame or a Beamforming Report Poll+HTC frame that contains an HT variant HT Control field. A VHT NDP or HE NDP is transmitted only following a SIFS that is after a VHT NDP Announcement or HE NDP Announcement frame. A VHT NDP Announcement frame or HE NDP Announcement frame is followed by a VHT NDP or a HE NDP that is after SIFS. An HE beamformer that has not received from a STA a HE Capabilities element or where the last HE Capabilities element received from the STA has the SU Beamformee Capable field and SU Implicit Beamformee Capable field set to false (i.e., 0) does not transmit either of the following: a VHT NDP Announcement frame or HE NDP Announcement frame addressed to the STA or that includes the STA's AID in one of the STA Info fields, or A Beamforming Report Poll frame or HE Beamforming Report Poll frame to the STA.

An HE beamformer that transmits a VHT NDP Announcement frame or HE NDP Announcement frame to an HE SU-only beamformee includes only one STA Info field in the VHT NDP Announcement frame or HE NDP Announcement frame and set the Feedback Type subfield of the STA Info field to SU. If the VHT NDP Announcement frame or HE NDP Announcement frame includes more than one STA Info field, the RA of the VHT NDP Announcement frame or the HE NDP Announcement frame is set to the broadcast address. If the VHT NDP Announcement frame or the HE NDP Announcement frame includes a single STA Info field, the RA of the VHT NDP Announcement frame is set to the media access control (MAC) address of the VHT beamformee. A VHT NDP Announcement frame or a HE NDP Announcement frame does not include two or more STA Info fields with same value in the AID subfield.

A VHT beamformer that transmits a VHT NDP Announcement frame or a HE NDP Announcement frame to a VHT beamformee or HE beamformee that is an AP, mesh STA or STA that is a member of an IBSS, includes a single STA Info field in the VHT NDP Announcement frame or the HE NDP Announcement frame and sets the AID field in the STA Info field to 0. A VHT NDP Announcement frame or a HE NDP Announcement frame with more than one STA Info field does not carry a VHT variant HT Control field, unless all the STAs listed in the AID field of the STA Info fields have set +HTC-VHT Capable to true (i.e., 1) in the VHT Capabilities Info field.

An HE beamformer that transmits a VHT NDP Announcement frame or a HE NDP Announcement frame with more than one STA Info field should transmit any Beamforming Report Poll or HE Beamforming Report Poll frames used to retrieve VHT Compressed Beamforming feedback or receive VHT NDP or HE NDP frames from the intended VHT beamformees in the same TXOP. If the duration of the TXOP that contained the VHT NDP Announcement frame or the HE NDP Announcement frame has insufficient duration to accommodate the transmission of all of the feedback reports, the VHT beamformer may poll for the remaining VHT Compressed Beamforming feedback or VHT NDP or HE NDP frames in subsequent transmission opportunities (TXOPs).

The transmission of the VHT NDP Announcement, HE NDP Announcement frame, VHT NDP, HE NDP, VHT Compressed Beamforming, and HE Beamforming Report Poll frames is subject to the rules of multiple frame transmission in an enhanced distributed channel access (EDCA) TXOP. An HE beamformer that sets the Feedback Type subfield of a STA Info field to MU is set the Nc Index subfield of the same STA Info field to a value equal to or less than the minimum of both the following: the maximum number of supported spatial streams according to the corresponding VHT beamformee's Rx VHT-MCS Map subfield in the Supported VHT-MCS and NSS Set field or the corresponding HE beamformee's Rx HE-MCS Map subfield in the Supported HE-MCS and number of spatial streams (NSS) Set field; or the maximum number of supported spatial streams according to the Rx NSS subfield value in the Operating Mode field of the most recently received Operating Mode Notification frame or Operating Mode Notification element with the Rx NSS Type subfield equal to false (i.e., 0) from the corresponding VHT beamformee or HE beamformee.

A non-AP VHT beamformee or HE beamformee that receives a VHT NDP Announcement frame from a HE beamformer with which it is associated or has an established DLS or TDLS session and that contains the VHT beamformee's AID or HE beamformee's AID in the AID subfield of the first (or only) STA Info field and also receives a VHT NDP or HE NDP after a SIFS that is after the VHT NDP Announcement frame, transmits the physical layer convergence protocol (PLCP) protocol data unit (PPDU) containing its VHT Compressed Beamforming feedback after a SIFS that is after the VHT NDP or HE NDP. A VHT beamformee or HE beamformee that is an AP, mesh STA, or STA that is a member of an independent basic service set (IBSS), that receives a VHT NDP Announcement frame with the RA matching its MAC address and the AID subfield of the only STA Info field set to 0, and that also receives a VHT NDP or HE NDP a SIFS that is the VHT NDP Announcement frame, transmits the PPDU containing its VHT Compressed Beamforming feedback after a SIFS that is after the VHT NDP or HE NDP. The TXVECTOR parameter CH_BANDWIDTH of the PPDU containing the VHT Compressed Beamforming feedback sent by the VHT beamformee is set to indicate a bandwidth not wider than that indicated in the RXVECTOR parameter CH_BANDWIDTH of the received VHT NDP frame or HE NDP frame. The TXVECTOR parameter CH_BANDWIDTH of the PPDU containing the VHT Compressed Beamforming feedback sent by the HE beamformee is set to indicate a bandwidth equal to that indicated in the RXVECTOR parameter CH_BANDWIDTH of the received VHT NDP frame or HE NDP frame.

A non-AP HE beamformee that receives a VHT NDP Announcement frame from a HE beamformer with which it is associated or has an established DLS or TDLS session and that contains the HE beamformee's AID in the AID subfield of the first (or only) STA Info field and also receives a VHT NDP or HE NDP a SIFS that is after the VHT NDP Announcement frame, transmits the PPDU containing its VHT Compressed Beamforming feedback after a SIFS that is after the VHT NDP or HE NDP, or sends a VHT NDP or HE NDP frame feedback after a SIFS that is after the VHT NDP or HE NDP if the SU Implicit Beamformer Capable field or MU Implicit Beamformer Capable field in the HE beamformer is set to true (i.e., 1).

An HE beamformee that is an AP, mesh STA, or STA that is a member of an IBSS, that receives a VHT NDP Announcement frame with the RA matching its MAC address and the AID subfield of the only STA Info field set to false (i.e., 0), and that also receives a VHT NDP or HE NDP after a SIFS that is after the VHT NDP Announcement frame, transmits the PPDU containing its VHT Compressed Beamforming feedback after a SIFS that is after the VHT NDP or HE NDP, or transmits a VHT NDP or HE NDP after a SIFS that is after the received VHT NDP or HE NDP if the SU Implicit Beamformer Capable field or MU Implicit Beamformer Capable field in the HE beamformer is set to true (i.e., 1). The TXVECTOR parameter CH_BANDWIDTH of the PPDU containing the VHT Compressed Beamforming feedback is set to indicate a bandwidth equal to that indicated in the RXVECTOR parameter CH_BANDWIDTH of the received VHT NDP frame or HE NDP frame.

A non-AP HE beamformee that receives a HE NDP Announcement frame from a HE beamformer with which it is associated or has an established DLS or TDLS session and that contains the HE beamformee's AID in the AID subfield of the first (or only) STA Info field and also receives a VHT NDP or HE NDP after a SIFS that is after the HE NDP Announcement frame, transmits the PPDU containing its VHT Compressed Beamforming feedback after a SIFS that is after the VHT NDP or HE NDP, or sends a VHT NDP or HE NDP frame feedback after a SIFS that is after the VHT NDP or HE NDP if the NDP Response Allowed subfield of the HE Sounding Dialog Token of the HE NDP Announcement frame is set to true (i.e., 1).

In other embodiments, if the NDP Response Allowed subfield of the HE Sounding Dialog Token of the HE NDP Announcement frame is set to true (i.e., 1) then the non-AP HE beamformee transmits a VHT NDP or HE NDP frame. An HE beamformee that is an AP, mesh STA, or STA that is a member of an IBSS, that receives a HE NDP Announcement frame with the RA matching its MAC address and the AID subfield of the only STA Info field set to 0, and that also receives a VHT NDP or HE NDP after a SIFS that is after the HE NDP Announcement frame, transmits the PPDU containing its VHT Compressed Beamforming feedback after a SIFS that is after the VHT NDP or HE NDP, or transmits a VHT NDP or HE NDP after a SIFS that is after the received VHT NDP or HE NDP. The TXVECTOR parameter CH_BANDWIDTH of the PPDU containing the VHT Compressed Beamforming feedback is set to indicate a bandwidth equal to that indicated in the RXVECTOR parameter CH_BANDWIDTH of the received VHT NDP frame or HE NDP frame.

A non-AP HE beamformee that receives a HE NDP Announcement frame from a HE beamformer with which it is associated or has an established DLS or TDLS session and that contains the HE beamformee's AID in the AID subfield of the first (or only) STA Info field transmits a VHT NDP or HE NDP frame after a SIFS that is after the HE NDP Announcement if the NDP Response Required subfield of the HE Sounding Dialog Token of the HE NDP Announcement frame is set to true (i.e., 1). An HE beamformee that is an AP, mesh STA, or STA that is a member of an IBSS, that receives a HE NDP Announcement frame with the RA matching its MAC address and the AID subfield of the only STA Info field set to false (i.e., 0), transmits a VHT NDP or HE NDP after a SIFS that is after the HE NDP Announcement frame if the NDP Response Required subfield of the HE Sounding Dialog Token of the HE NDP Announcement frame is set to true (i.e., 1). The TXVECTOR parameter CH_BANDWIDTH of the VHT NDP or HT NDP is set to indicate a bandwidth equal to that indicated in the RXVECTOR parameter CH_BANDWIDTH of the received the HE NDP Announcement frame.

In some embodiments, a STA ignores a received VHT NDP Announcement, HE NDP Announcement, VHT NDP, HE NDP, Beamforming Report Poll, or HE Beamforming Report Poll frames if the field dot11VHTSUBeamformeeImplemented, dot11HESUBeamformeeImplemented and dot11HESUImplicitBeeImplemented are false (i.e., 0). A VHT beamformee or HE beamformee indicates the maximum number of space-time streams it can receive in a VHT NDP or HE NDP in the Beamformee STS Capability field. If the beamformee is a non-AP STA, this shall also be the maximum total number of space-time streams that the STA can receive in a VHT MU PPDU or HE MU PPDU.

A non-AP VHT beamformee or non-AP HE beamformee that receives a VHT NDP Announcement frame from a HE beamformer with which it is associated or has an established DLS or TDLS session and that contains the VHT beamformee's AID or the HE beamformee's AID in the AID subfield of a STA Info field that is not the first STA Info field transmits its VHT Compressed Beamforming feedback after a SIFS that is after a subsequent received Beamforming Report Poll with an RA matching its MAC address and a non-bandwidth signaling TA obtained from the TA field matching the MAC address of the HE beamformer. If the RXVECTOR parameter CH_BANDWIDTH_IN_NON_HT of the received Beamforming Report Poll frame is valid, the TXVECTOR parameter CH_BANDWIDTH of the PPDU containing the VHT Compressed Beamforming feedback sent by the VHT beamformee is set to indicate a bandwidth not wider than that indicated by the RXVECTOR parameter CH_BANDWIDTH_IN_NON_HT of the Beamforming Report Poll frame; otherwise, the TXVECTOR parameter CH_BANDWIDTH of the PPDU containing VHT Compressed Beamforming feedback sent by the VHT beamformee is set to indicate a bandwidth not wider than that indicated by the RXVECTOR parameter CH_BANDWIDTH of the Beamforming Report Poll frame.

If the RXVECTOR parameter CH_BANDWIDTH_IN_NON_HT of the received Beamforming Report Poll frame is valid, the TXVECTOR parameter CH_BANDWIDTH of the PPDU containing the VHT Compressed Beamforming feedback sent by the HE beamformee is set to indicate a bandwidth equal to that indicated by the RXVECTOR parameter CH_BANDWIDTH_IN_NON_HT of the Beamforming Report Poll frame; otherwise, the TXVECTOR parameter CH_BANDWIDTH of the PPDU containing VHT Compressed Beamforming feedback sent by the HE beamformee is set to indicate a bandwidth equal to that indicated by the RXVECTOR parameter CH_BANDWIDTH of the Beamforming Report Poll frame.

A non-AP HE beamformee that receives a VHT NDP Announcement frame from a HE beamformer with which it is associated or has an established DLS or TDLS session and that contains the HE beamformee's AID in the AID subfield of a STA Info field that is not the first STA Info field shall either transmit its VHT Compressed Beamforming feedback after a SIFS that is after receiving a Beamforming Report Poll or HE Beamforming Report Poll with RA matching its MAC address and a non-bandwidth signaling TA obtained from the TA field matching the MAC address of the HE beamformer, or transmit a VHT NDP or HE NDP frame if the NDP Response subfield of the HE Beamforming Report Poll is set to true (i.e., 1). In other embodiments, if the NDP Response subfield of the HE Beamforming Report Poll is set to true (i.e., 1) then the non-AP HE beamformee transmits a VHT NDP or HE NDP frame. If the RXVECTOR parameter CH_BANDWIDTH_IN_NON_HT of the received Beamforming Report Poll frame or HE Beamforming Report Poll frame is valid, the TXVECTOR parameter CH_BANDWIDTH of the PPDU containing the VHT Compressed Beamforming feedback or VHT NDP or HE NDP is set to indicate a bandwidth equal to that indicated by the RXVECTOR parameter CH_BANDWIDTH_IN_NON_HT of the Beamforming Report Poll frame or HE Beamforming Report Poll frame; otherwise, the TXVECTOR parameter CH_BANDWIDTH of the PPDU containing VHT Compressed Beamforming feedback is set to indicate a bandwidth equal to that indicated by the RXVECTOR parameter CH_BANDWIDTH of the Beamforming Report Poll frame.

A non-AP HE beamformee that receives a HE NDP Announcement frame from a HE beamformer with which it is associated or has an established DLS or TDLS session and that contains the HE beamformee's AID in the AID subfield of a STA Info field that is not the first STA Info field shall either transmit its VHT Compressed Beamforming feedback a SIFS after receiving a Beamforming Report Poll with RA matching its MAC address and a non-bandwidth signaling TA obtained from the TA field matching the MAC address of the HE beamformer, or transmit a VHT NDP or HE NDP frame if the NDP Response Allowed subfield of the HE Sounding Dialog Token of the HE NDP Announcement frame is set to 1. In other embodiments the design choice might require that if the NDP Response Allowed subfield of the HE Sounding Dialog Token of the HE NDP Announcement frame is set to 1 then the non-AP HE beamformee shall transmit a VHT NDP or HE NDP frame. If the RXVECTOR parameter CH_BANDWIDTH_IN_NON_HT of the received Beamforming Report Poll frame is valid, the TXVECTOR parameter CH_BANDWIDTH of the PPDU containing the VHT Compressed Beamforming feedback or VHT NDP or HE NDP shall be set to indicate a bandwidth equal to that indicated by the RXVECTOR parameter CH_BANDWIDTH_IN_NON_HT of the Beamforming Report Poll frame; otherwise, the TXVECTOR parameter CH_BANDWIDTH of the PPDU containing VHT Compressed Beamforming feedback shall be set to indicate a bandwidth equal to that indicated by the RXVECTOR parameter CH_BANDWIDTH of the Beamforming Report Poll frame.

In some embodiments, a non-AP HE beamformee that receives a HE NDP Announcement frame from a HE beamformer with which it is associated or has an established DLS or TDLS session and that contains the HE beamformee's AID in the AID subfield of a STA Info field that is not the first STA Info field transmits either VHT Compressed Beamforming feedback or VHT NDP or HE NDP after a SIFS that is after receiving a HE Beamforming Report Poll with RA matching its MAC address and a non-bandwidth signaling TA obtained from the TA field matching the MAC address of the HE beamformer and if the NDP Response field of the HE Beamforming Report Poll is set to true (i.e., 1), otherwise if the NDP Response field of the HE Beamforming Report Poll is set to false (i.e., 0) the HE beamformee responds with VHT Compressed Beamforming feedback. In other embodiments the if the NDP Response subfield of the HE Beamforming Report Poll is set to true (i.e., 1) then the HE beamformee transmits a VHT NDP or HE NDP frame. If the RXVECTOR parameter CH_BANDWIDTH_IN_NON_HT of the received Beamforming Report Poll frame is valid, the TXVECTOR parameter CH_BANDWIDTH of the PPDU containing the HE Compressed Beamforming feedback or VHT NDP or HE NDP is set to indicate a bandwidth equal to that indicated by the RXVECTOR parameter CH_BANDWIDTH_IN_NON_HT of the Beamforming Report Poll frame; otherwise, the TXVECTOR parameter CH_BANDWIDTH of the PPDU containing HE Compressed Beamforming feedback shall is set to indicate a bandwidth equal to that indicated by the RXVECTOR parameter CH_BANDWIDTH of the Beamforming Report Poll frame.

A non-AP HE beamformee that receives a HE NDP Announcement frame from a HE beamformer with which it is associated or has an established DLS or TDLS session and that contains the HE beamformee's AID in the AID subfield of a STA Info field that is not the first STA Info field transmits the VHT NDP or HE NDP after a SIFS that is after a received HE NDP Announcement frame if the NDP Response Allowed subfield of the HE Sounding Dialog Token of the HE NDP Announcement frame is set to true (i.e., 1). If the RXVECTOR parameter CH_BANDWIDTH_IN_NON_HT of the received HE NDP Announcement frame is valid, then the TXVECTOR parameter CH_BANDWIDTH of the VHT NDP or HE NDP shall be set to indicate a bandwidth equal to that indicated by the RXVECTOR parameter CH_BANDWIDTH_IN_NON_HT of the Beamforming Report Poll frame; otherwise, the TXVECTOR parameter CH_BANDWIDTH is set to indicate a bandwidth equal to that indicated by the RXVECTOR parameter CH_BANDWIDTH of the Beamforming Report Poll frame.

In other embodiments, a HE beamformee might respond with VHT NDP or HE NDP instead of VHT Compressed Beamforming feedback if the SU Implicit Beamformer Capable field or MU Implicit Beamformer Capable field in the HE beamformer is set to true (i.e., 1).

In the above embodiments it is said that a HE beamformee responds with a VHT NDP or an HE NDP whenever the conditions are met as explained herein-above. In other embodiments, the HE beamformer might mandate whether the HE beamformee should respond with VHT NDP or HE NDP. In these embodiments, the HE beamformer sets the NDP Response Required subfield in the HE Beamforming Report Poll frame to value 2 or similar value identifying the type of NDP response. When a HE beemformee is polled with HE Beamforming Report Poll whose NDP Response Required subfield is set to value 2, the HE beamformee responds with HE NDP frame, and if the NDP Response Required subfield is set to value 1, then the HE beamformee responds with VHT NDP frame. If the NDP Response Required subfield is set to value 0, the HE beamformee responds according to the rules stated above.

An HE beamformee that sends an HE NDP Announcement frame with subfield NDP Response Required set to 1, shall subsequently send HE Beamforming Report Poll frames to the beamformees listed in HE NDP Announcement frame, where the NDP Response Required subfield of HE Beamforming Report Poll frames set to 1.

Figure 4A:
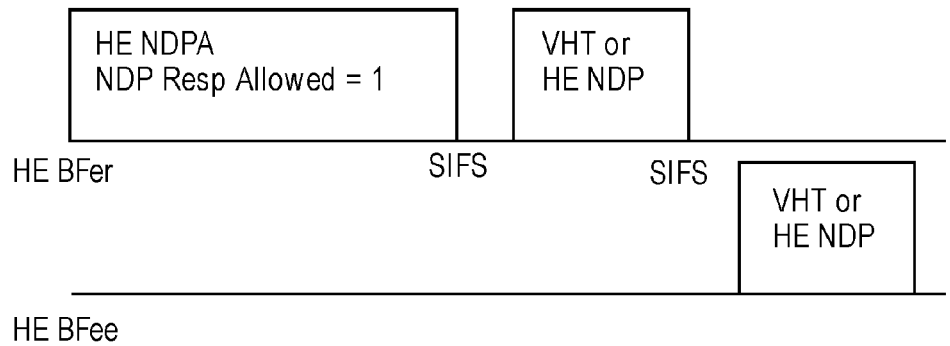
FIG. 4A is a timing diagram of one example of the HE sounding procedure with one HE beamformee.
Figure 4B:
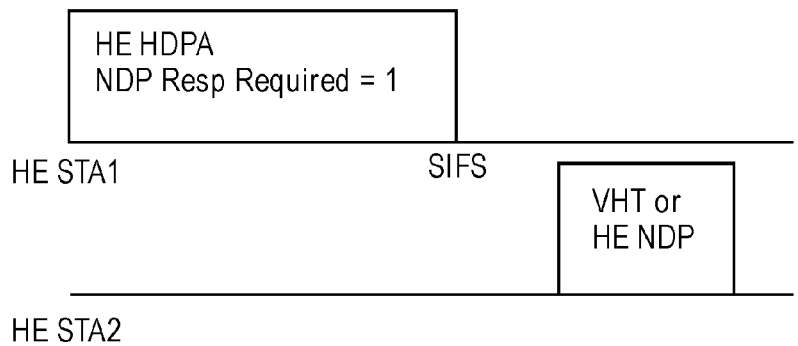
FIG. 4B is a timing diagram of one example of the HE sounding procedure with more than one HE beamformee and VHT beamformee.
Figure 4C:
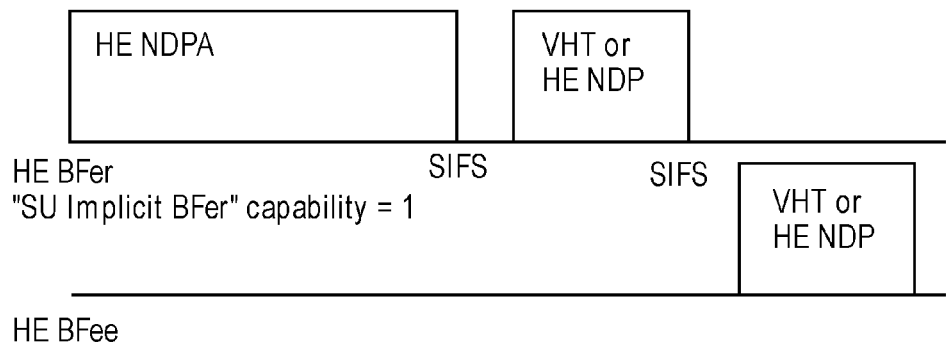
FIG. 4C is a timing diagram of one example of the HE sounding procedure with a single-user where a VHT NPDA is utilized.

FIGS. 4A-4C are example cases where a SU HE sounding feedback sequence is employed. FIG. 4A is a timing diagram of one example of the HE sounding procedure with one HE beamformee. In this example, the HE NDPA is sent by the HE BFer to the HE BFee. The HE NDPA in this example includes an NDPA Response Allowed subfield set to true (i.e., 1). The HE NDPA is followed by a SIFS then a VHT or HE NDP followed by a further SIFS. The BFee receives the HE NDPA and since it supports the HE sounding procedure provides either a VHT or HE NDP from which the BFer can derive implicit feedback.

FIG. 4B is a timing diagram of one example of the HE sounding procedure with one or more HE beamformee and VHT beamformee. In this example, the HE NDPA is sent by the by either an HE BFer (i.e., HE STA1) to the HE BFee (i.e., HE STA2) or alternatively from an HE BFee (i.e., HE STA1) to one or more HE BFers (e.g., HE STA2 in FIG. 4B). The HE NDPA in this example includes an NDPA Response Required subfield set to true (i.e., 1). The HE NDPA is followed by a SIFS. In the first embodiment, the BFee (HE STA2) receives the HE NDPA and since it supports the HE sounding procedure, the BFee provides either a VHT or HE NDP from which the BFer can derive implicit feedback. In the second embodiment, for example in cases related to UL MU MIMO, the HE NDPA is sent by the HE BFee (i.e., HE STA1), e.g. an AP that is expected to be the recipient of the upcoming UL MU PPDU, to several HE BFers (i.e., HE STA2). The HE NDPA in this second embodiment indicates the application of the HE sounding procedure to subsequent UL MU transmissions. The HE NDPA is followed by a SIFS. The BFee, e.g. an AP that is expected to be the recipient of the upcoming UL MU PPDU, receives the NDP frame from one or more HE STAs, where each STA either sends the NDP frame full-band, i.e. over the entire bandwidth of the expected response frame, or over one or more sub-bands. The scheduling and indication of which sub-bands for each responding STA the NDP frame shall be sent is indicated within the NDPA frame. In some embodiments, the role of NDPA is split in two parts, each sent in a frame, where the first part of the NDPA frame announces the sounding STAs (with the similar contents as described in the other embodiments), followed by an IFS such as SIFS, followed by a second part of the NDPA frame that announces the scheduling and indication of which sub-bands for each responding STA the NDP frame may be sent. The AP may send the second part of the NDPA frame more than once, each time addressing a set of STAs, where all the STAs that are addressed in the second part of the NDPA frame have been identified in the first part of the NDPA frame. Each time that the BFee, e.g. an AP, receives the NDP frame from one or more STAs, since the AP supports the HE sounding procedure, the BFee processes the NDP frame(s) accordingly.

FIG. 4C is a timing diagram of one example of the HE sounding procedure with a single-user where a VHT NPDA is utilized. In this embodiment, the support of the HE BFee is known due to the SU Implicit BFer capability element being set to true (i.e., 1). Thus, a VHT NDPA and VHT or HE NDP are sent by the BFer. After a SIFS the BFee replies with a VHT or HE NDP that can be utilized by the BFer to derive implicit feedback and construct the steering matrix or compressed beamforming report.

In some embodiments, the RA field of the VHT Compressed Beamforming frame(s) of the VHT Compressed Beamforming feedback is set to a non-bandwidth signaling TA obtained from the TA field of the VHT NDP Announcement frame or the HE NDP Announcement frame or the Beamforming Report Poll frame or the HE Beamforming Report Poll frame to which the given VHT Compressed Beamforming feedback is a response. If the HE Beamformee is transmitting VHT Compressed Beamforming frame(s) after a SIFS that is after the VHT NDP or HE NDP, then the VHT Compressed Beamforming frame(s) includes the VHT Compressed Beamforming Report information and, for the case of MU feedback, the MU Exclusive Beamforming Report information.

An HE beamformee that transmits a VHT Compressed Beamforming frame sets the Feedback Type field in the VHT MIMO Control field to the same value as the Feedback Type field in the corresponding STA Info field in the VHT NDP Announcement frame or the HE NDP Announcement frame. If the Feedback Type field indicates MU, the STA sends a VHT Compressed Beamforming frame with the Nc Index field value in the VHT MIMO Control field equal to the minimum of all the following: (1) the Nc Index field value in the corresponding STA Info field in the VHT NDP Announcement frame or the HE NDP Announcement frame; (2) the maximum number of supported spatial streams according to its Rx VHT-MCS Map subfield in the Supported VHT-MCS and NSS Set field or according to its Rx HE-MCS Map subfield in the Supported HE-MCS and NSS Set field; or (3) the maximum number of supported spatial streams according to its Rx NSS subfield value in the Operating Mode field of the Operating Mode Notification frame or Operating Mode Notification element transmitted most recently by the HE beamformee If the Feedback Type indicates SU, the Nc Index field value in the VHT MIMO Control field is determined by the HE beamformee.

The Nr Index field in the VHT MIMO Control field can be set to the same value as the RXVECTOR parameter NUM_STS of the corresponding VHT NDP. The Nc Index field is not set to a value larger than the Nr Index value in the VHT MIMO Control field. An HE beamformee shall set the value of the Channel Width subfield in the VHT MIMO Control field of a VHT Compressed Beamforming frame to the same value as the RXVECTOR parameter CH_BANDWIDTH of the corresponding VHT NDP frame or HE NDP frame.

Figure 5A:
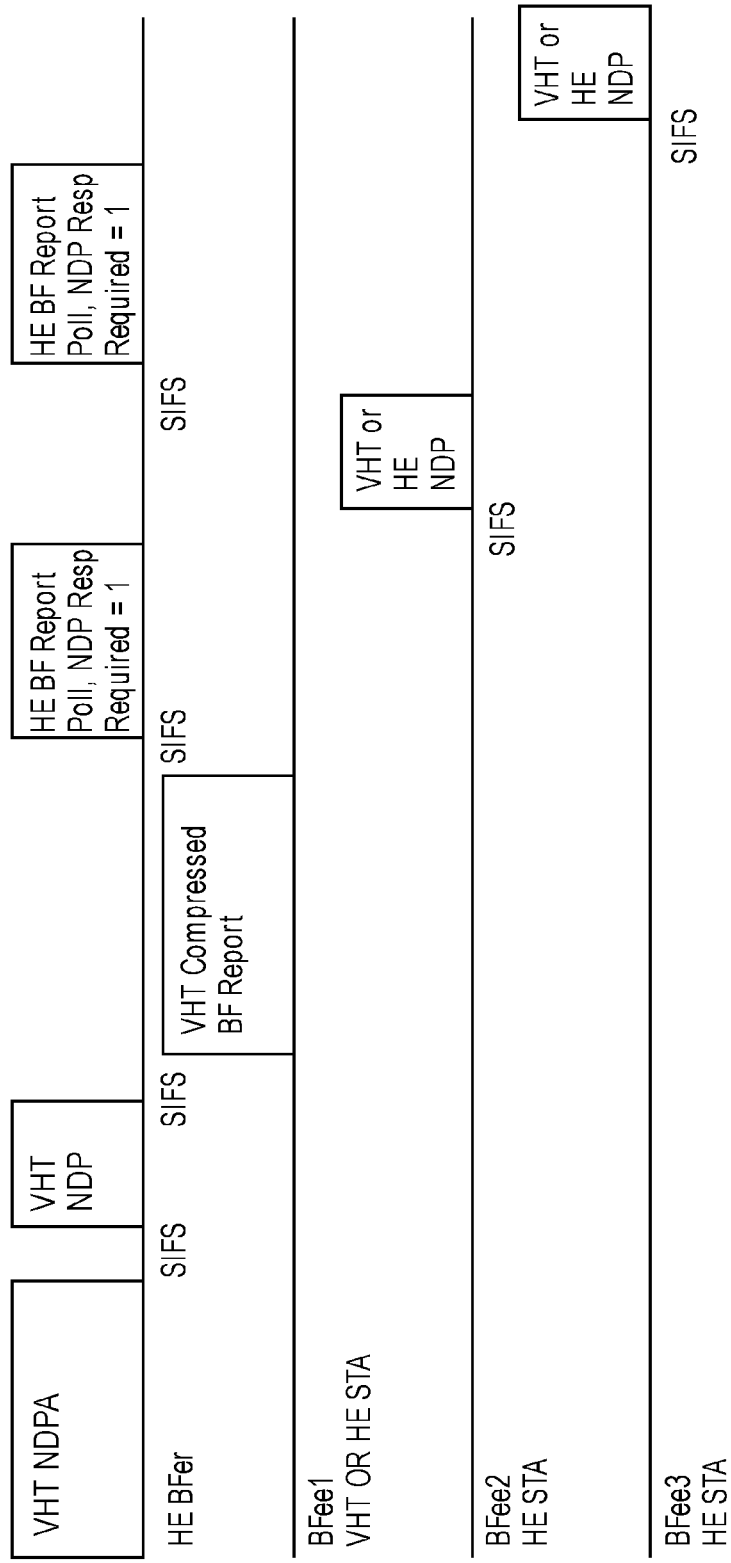
FIG. 5A is a timing diagram of one example of the HE sounding procedure with multiple HE beamformees where a first beamformee does not support the HE sounding procedure.
Figure 5B:
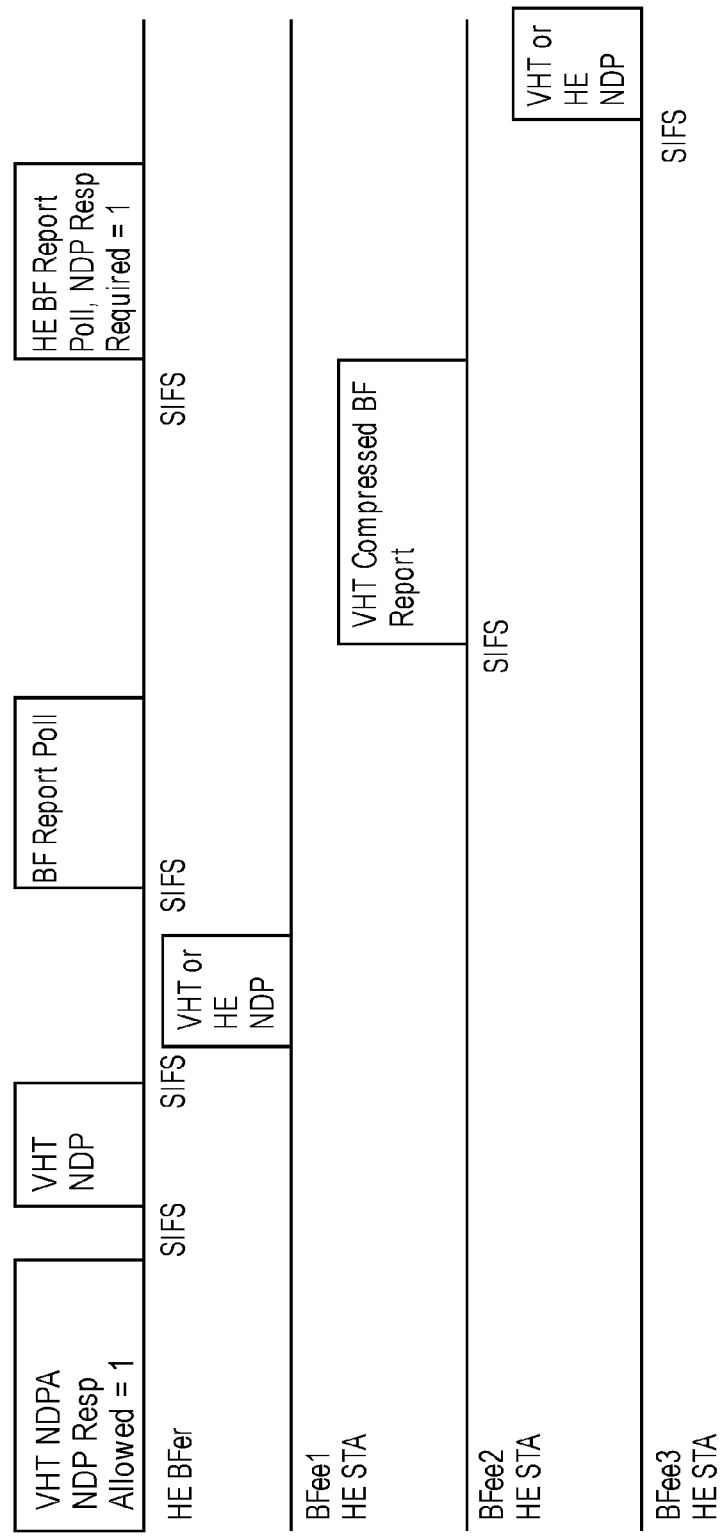
FIG. 5B is a timing diagram of one example of the HE sounding procedure with multiple HE beamformees where a second beamformee does not support the HE sounding procedure.
Figure 5C:
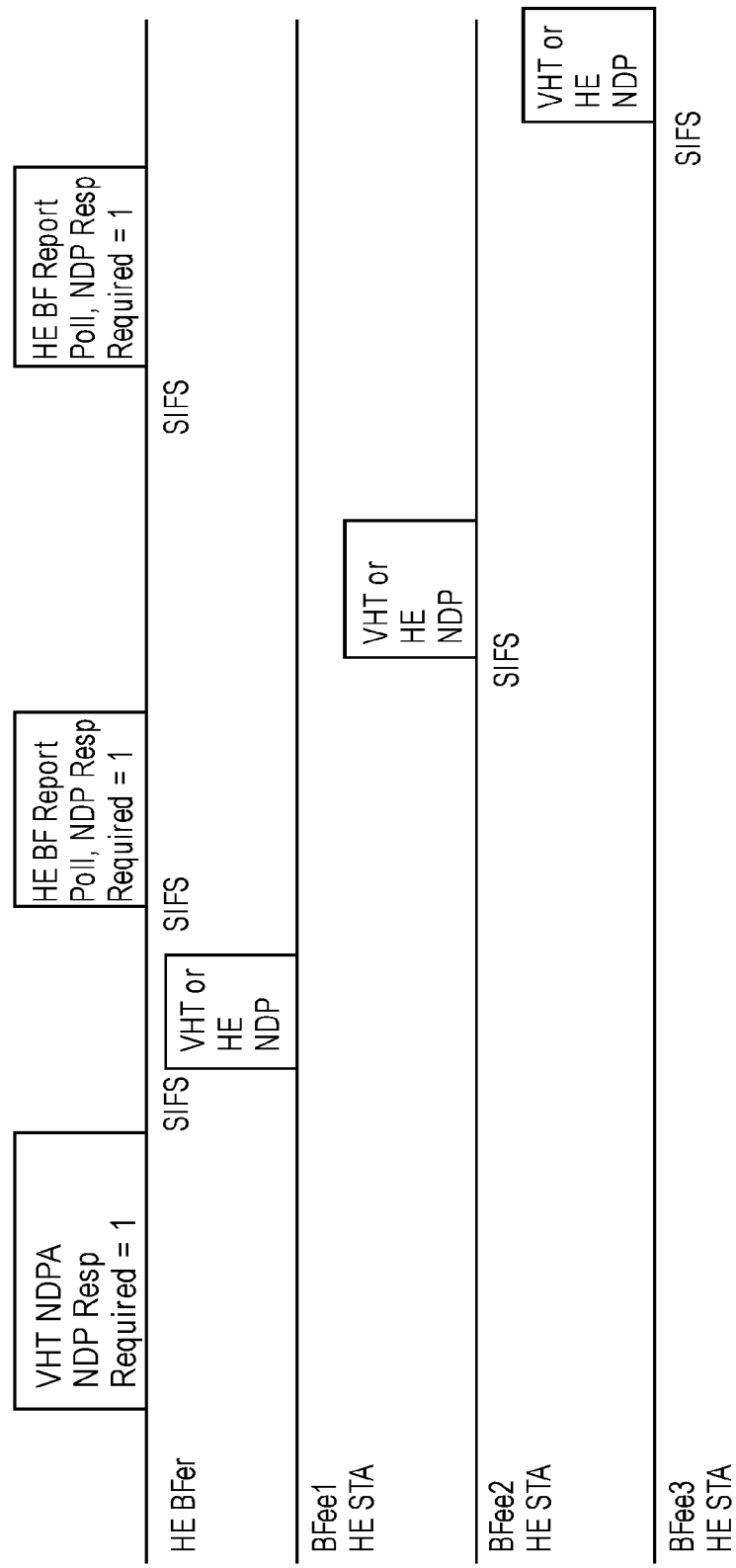
FIG. 5C is a timing diagram of one example of the HE sounding procedure with multiple HE beamformees where all beamformees support the HE sounding procedure.

FIGS. 5A-5C are example cases where a MU HE sounding feedback sequence is employed. FIG. 5A is a timing diagram of one example of the HE sounding procedure with multiple HE beamformees. In this example, the VHT NDPA is sent by the HE BFer to the set of HE BFees. The VHT NDPA in this example does not include an NDPA Response Allowed or Required subfield, because the BFer is aware the first BFee does not support the HE sounding procedure. The VHT NDPA is followed by a SIFS then a VHT NDP followed by a further SIFS. The first BFee receives the VHT NDPA, but does not support the HE sounding procedure. The first BFee replies with the VHT compressed BF report. For the next BFee, after an SIFS, the BFer sends a HE BF report poll with a NDP Response Required set to 1. The second BFee provides either a VHT or HE NDP from which the BFer can derive implicit feedback. The third STA similarly receives the BF report poll and responds with a VHT or HE NDP from which the BFer can derive implicit feedback.

FIG. 5B is a timing diagram of one example of the HE sounding procedure with multiple HE beamformees. In this example, the HE NDPA is sent by the HE BFer to the set of HE BFees. The HE NDPA in this example includes an NDPA Response Allowed subfield. A VHT or HE NDP is then sent after a SIFS. The first BFee receives the HE NDPA and supports the HE sounding procedure. The first BFee replies with the VHT or HE NDP. The BFer will then derive implicit feedback from the response. For the next BFee, after an SIFS, the BFer sends a HE BF report poll with a NDP Response Required set to 1. The second BFee provides VHT Compressed BF Report, unlike the first BFee that had chosen to send VHT or HE NDP frame. The third STA similarly receives the HE BF report poll that includes a NDP Response Required set to 1 and responds with a VHT or HE NDP from which the BFer can derive implicit feedback.

FIG. 5C is a timing diagram of one example of the HE sounding procedure with multiple HE beamformees. In this example, the HE NDPA is sent by the HE BFer to the set of HE BFees. The HE NDPA in this example includes an NDPA Response Required subfield. A VHT or HE NDP is then sent after a SIFS. The first BFee receives the HE NDPA and supports the HE sounding procedure. The first BFee replies with the VHT or HE NDP. The BFer will then derive implicit feedback from the response. For the next BFee, after an SIFS, the BFer sends a BF report poll. The second BFee provides a VHT Compressed BF report as it does not support the HE sounding procedure. The third STA similarly receives the HE BF report poll that includes a NDP Response Required set to 1 and responds with a VHT or HE NDP from which the BFer can derive implicit feedback.

An HE beamformee does not include MU Exclusive Beamforming Report information in VHT Compressed Beamforming feedback if the Feedback Type subfield in the MIMO Control field of the VHT Compressed Beamforming frame(s) indicates SU. An HE beamformee includes both VHT Compressed Beamforming Report information and MU Exclusive Beamforming Report information in VHT Compressed Beamforming feedback if the Feedback Type subfield in the MIMO Control field of the VHT Compressed Beamforming frame(s) indicates MU.

An HE beamformee that transmits VHT Compressed Beamforming feedback may include neither the VHT Compressed Beamforming Report information nor the MU Exclusive Beamforming Report information if the transmission duration of the PPDU carrying the VHT Compressed Beamforming Report information and any MU Exclusive Beamforming Report information would exceed the maximum PPDU duration. The value of the Sounding Dialog Token Number subfield in the VHT MIMO Control field may be set to the same value as the Sounding Dialog Token Number subfield in the Sounding Dialog Token field in the corresponding VHT NDP Announcement frame or HE NDP Announcement frame. If the transmission duration of the planned PPDU carrying the VHT Compressed Beamforming Report information and any MU Exclusive Beamforming Report information would exceed the maximum PPDU duration, the HE beamformee may transmit a VHT NDP or HE NDP frame instead.

The HE beamformer can use the sounding dialog token in the VHT Compressed Beamforming frame(s) of the VHT Compressed Beamforming feedback to associate the feedback with a prior VHT NDP Announcement frame or HE NDP Announcement frame and thus compute the delay between sounding and receiving the feedback. The VHT beamformer can use this delay time when making a decision regarding the applicability of the feedback for the link. Recovery in the case of a missing response to a VHT NDP Announcement, HE NDP Announcement, Beamforming Report Poll or HE Beamforming Report Poll frame follows the rules for multiple frame transmission in an EDCA TXOP. VHT Compressed Beamforming feedback is comprised of the VHT Compressed Beamforming Report information and the MU Exclusive Beamforming Report information.

An HE beamformee might send its VHT Compressed Beamforming frame with specific content, as described below, in place of VHT NDP or HE NDP in all the situations that was indicated above. In these circumstances the VHT Compressed Beamforming frame does not include VHT Compressed Beamforming Report information nor the MU Exclusive Beamforming Report information. In these circumstances the VHT Compressed Beamforming frame Action field format is: Category, VHT Action, VHT MIMO Control. The content of Category and VHT Action are as specified in IEEE 802.11 specification. The content of VHT MIMO Control are reserved values. In other embodiments, the VHT MIMO Control might be excluded from the VHT Compressed Beamforming frame. The format that caries the VHT Compressed Beamforming frame shall be either VHT or HE, and the following TXVECTOR parameters are used for this frame: FORMAT set to VHT or HE; N_TX set to the maximum number of transmit chains the HE beamformee supports; FEC CODING set to BCC CODING or LDPC_CODING; APEP_LENGTH set to 0; GI TYPE set to SHORT_GI if the HE beamformee supports otherwise set to LONG GI or other GI that HE format supports; MCS set to the maximum MCS that HE beamformee supports for the maximum NSS it supports; BEAMFORMED set to 1, NUM_USERS set to 1; NUM_STS indicates the maximum number of space-time streams that the HE beamformee supports according to its Supported VHT-MCS and NSS Set field or the Supported HE-MCS and NSS Set field in VHT Capabilities or HE Capabilities; or CH_BANDWIDTH set to the same value as the TXVECTOR parameter CH_BANDWIDTH in the preceding VHT NDP Announcement frame or HE NDP Announcement frame.

Figure 6:
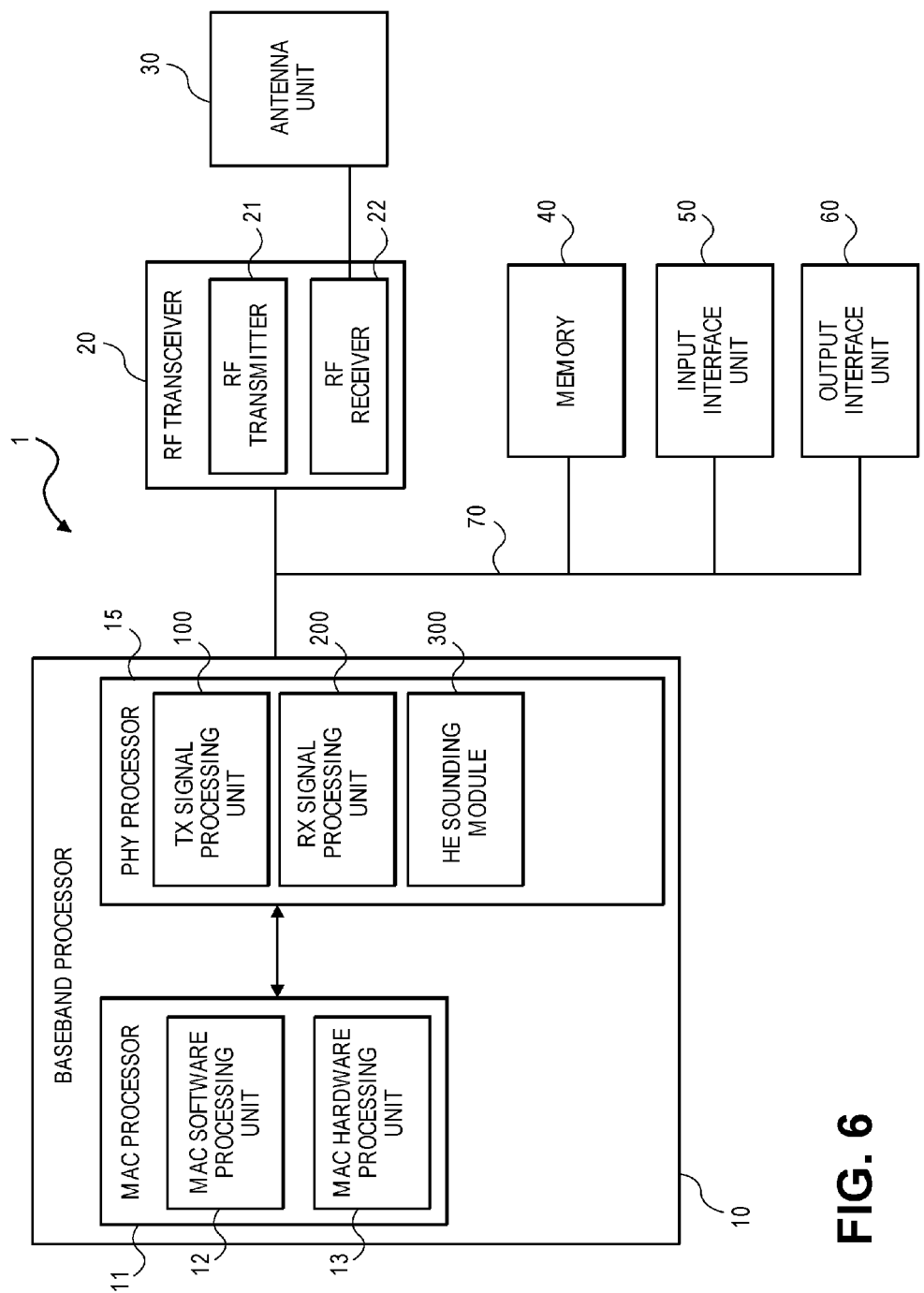
FIG. 6 is a diagram of a network device implementing a station or access point that executes an HE sounding procedure.
Figure 9:
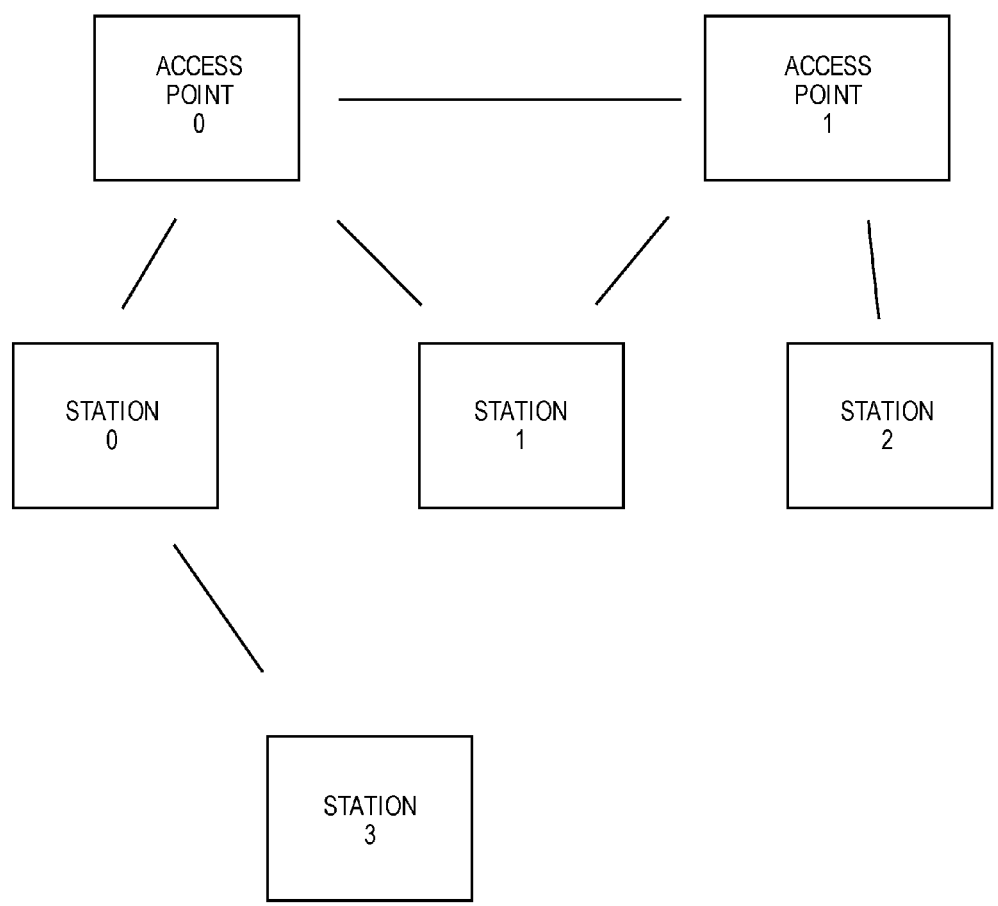
FIG. 9 is a diagram of an example wireless local area network.

FIG. 6 is a diagram of a network device implementing a station or access point that executes the HE sounding procedure. In a wireless local area network (WLAN) such as the example WLAN illustrated in FIG. 9, a basic service set (BSS) includes a plurality of network devices referred to herein as WLAN devices. Each of the WLAN devices may include a medium access control (MAC) layer and a physical (PHY) layer according to IEEE (Institute of Electrical and Electronics Engineers) 802.11 standard. In the plurality of WLAN devices, at least one WLAN device may be an access point (AP) station (e.g., access point 0 and access point 1 in FIG. 9) and the other WLAN devices may be non-AP stations (non-AP STAs), (e.g., stations 0-3 in FIG. 9). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 9, a WLAN can have any combination of stations and access points that can form discrete network, an ad hoc network or any combination thereof. Any number of APs and stations can be included in a WLAN and any topology and configuration of such APs and stations in the network can be utilized.

Referring to FIG. 9, the example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC).

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 7 and 8. In some embodiments, the PHY processor 15 can also implement an HE sounding module 300. The HE sounding module 300 can implement the respective functions for any combination of the embodiments described herein above with regard to FIGS. 1-5. In other embodiments, this module may be implemented by or distributed over both the PHY processor 15 and the MAC processor 11. These modules may be implemented as software or as hardware components of either the PHY processor 15 or MAC processor 11. These modules can also be implemented as components of the transmitting signal processing unit 100 and the receiving signal processing unit 200 or as discrete components. In a further embodiment, the HE sounding module 300 can be implemented by separate components or processors within the baseband processor.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store the nearby stations set. The input interface unit 50 receives information from a user and the output interface unit 60 outputs information to the user.

The antenna unit 30 includes one or more antennas. When a multiple-input multiple-output (MIMO) or a multi-user MIMO (MU-MIMO) system is used, the antenna unit 30 may include a plurality of antennas.

Figure 7:
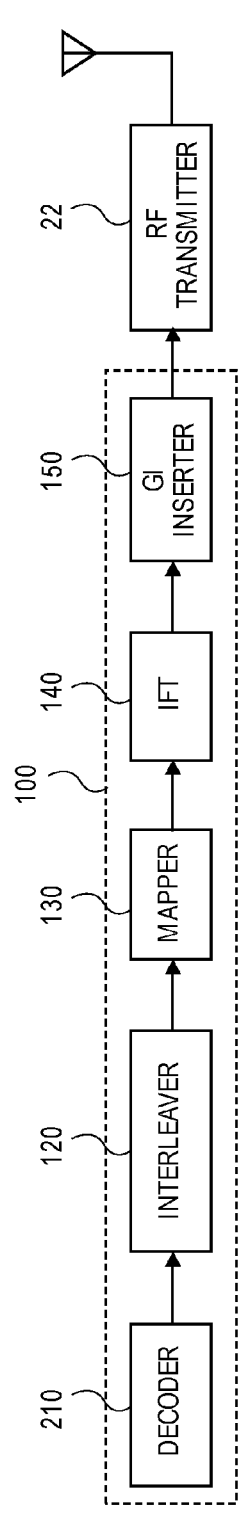
FIG. 7 is a schematic block diagram exemplifying a transmitting signal processor in a WLAN device.

FIG. 7 is a schematic block diagram exemplifying a transmitting signal processor in a WLAN device. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number Nss of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the Nss spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 8:
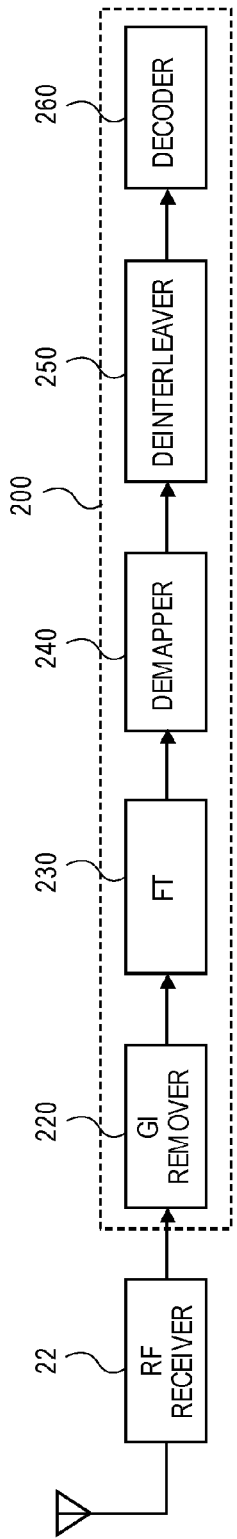
FIG. 8 is a schematic block diagram exemplifying a receiving signal processing unit in the WLAN.

FIG. 8 a schematic block diagram exemplifying a receiving signal processing unit in the WLAN. Referring to FIG. 8, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

A frame as used herein may refer to a data frame, a control frame, or a management frame may be exchanged between WLAN devices. The data frame is used for transmission of data forwarded to a higher layer. The WLAN device transmits the data frame when the wireless medium is considered to be in an idle condition or state such as after performing backoff if a DIFS has elapsed from a time when the medium was not busy or under similar conditions. The management frame is used for exchanging management information, which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for an associated access category (AC), i.e., AIFS[AC] has elapsed. In this case, the data frame, the management frame, or the control frame, which is not the response frame, may use the AIFS[AC].

As discussed herein the HE sounding procedure and in particular an HE sounding module is implemented to efficiently determine a steering matrix or compressed beamforming report by an AP or similar device.

Figure 10:
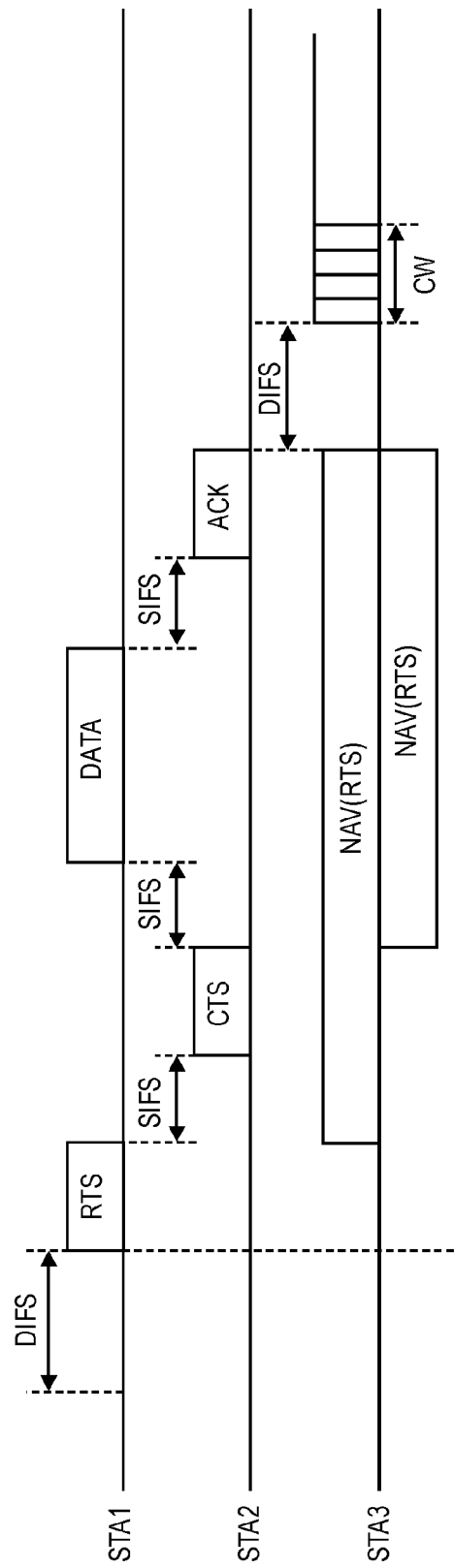
FIG. 10 is a timing diagram providing an example of the carrier sense multiple access/collision avoidance (CSMA/CA) transmission procedure.

FIG. 10 is a timing diagram providing an example of the CSMA/CA transmission procedure. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+ SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

The PHY entity for 802.11 implemented in the WLAN device is based on orthogonal frequency division multiple access OFDM or OFDMA. In either OFDM or OFDMA PHY layers, a STA is capable of transmitting and receiving PPDUs that are compliant with the mandatory PHY specifications. In a PHY specification, set of MCS and maximum number of spatial streams are defined. Also in some PHY entities, downlink and/or uplink MU transmission with a maximum number of space-time streams per user and up to a fix total number of space-time streams is defined.

Figures 11, 12:
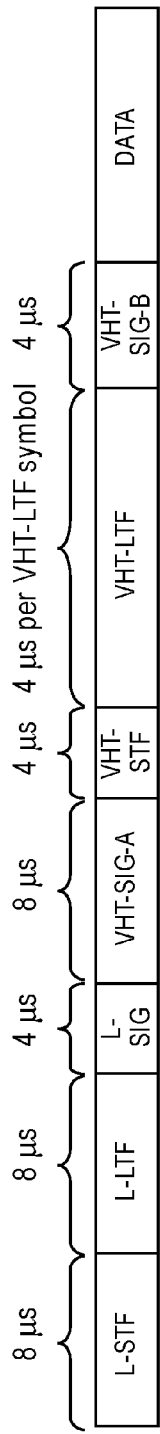
FIG. 11 is a diagram of a very high throughput (VHT) physical layer convergence protocol (PLCP) protocol data unit PPDU utilized by a WLAN device physical layer.
FIG. 12 is a table of the fields of the VHT PPDU.

FIG. 11 is a diagram of a very high throughput (VHT) PPDU utilized by the WLAN device PHY layer. FIG. 12 is a table of the fields of the VHT PPDU. Some PHY entities define PPDU that are individually addressed (where identification is based on AID or Partial AID) and some are group addressed (where identification is based on Group ID, GID). Some PHY entities provide support for 20 MHz, 40 MHz, 80 MHz and 160 MHz contiguous channel widths and support for 80+80 MHz non-contiguous channel width. The data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) is used with coding rates of 1/2, 2/3, 3/4 and 5/6.

In each PHY entity, there would be fields denoted as L-SIG, SGI-A, SIG-B where some crucial information about the PSDU attributes are listed. These symbols are usually encoded with the most robust MCS. The L-SIG, SGI-A, SIG-B have very limited number of bits and it is desired to encode them in the most compact form possible. In a receiving STA, first these symbols are decoded in order to obtain vital information about the PSDU attributes and some MAC attributes. In IEE 802.11ac, these symbols are called VHT SIG-A and VHT SIG-B symbols.

As discussed above, WLAN devices are currently being deployed in diverse environments. These environments are characterized by the existence of many access points and non-AP stations in geographically limited areas. Increased interference from neighboring devices gives rise to performance degradation. Additionally WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved power consumption for battery-operated devices.

IEEE 802.11ax or HE SIG-A and IEEE 802.11ax or HE SIG-B are referred to simply as simply by SIG-A and SIG-B and are amendments to the 802.11 standard directed at addressing these problems. Unlike previous amendments where the focus was on improving aggregate throughput, this amendment focuses on improving metrics that reflect user experience, such as average per station throughput, the 5th percentile of per station throughput of a group of stations, and area throughput. Improvements will be made to support environments such as wireless corporate office, outdoor hotspot, dense residential apartments, and stadiums.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

Note the operations of the flowcharts are described with reference to the exemplary embodiments of the diagrams. However, it should be understood that the operations of flowcharts can be performed by embodiments of the invention other than those discussed, and the embodiments of the diagrams can perform operations different than those discussed with reference to the flowcharts.

While the flowcharts in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device operating in a wireless local area network (WLAN), the method to improve efficiency for beamforming for multiple antenna array communications where a steering matrix or compressed beamforming report is determined by the network device using implicit feedback from at least one station in the WLAN, where explicit feedback is channel characteristics calculated and provided by the at least one station and where implicit feedback is channel characteristics calculated by the network device using a response frame from the at least one station, the steering matrix to determine a spatial path for transmission from a beamformer to each beamformee in the WLAN, the method comprising:

generating a first sounding frame to initiate a sounding feedback sequence, the first sounding frame including an indicator to request a first response frame from a first station to enable the network device to compute a first steering matrix or a first compressed beamforming report, wherein the indicator indicates either null data packet (NDP) response allowed or NDP response required, wherein when the indicator indicates the NDP response allowed, the first response frame is one of a Very High Throughput (VHT) NDP, a High Efficiency (HE) NDP or a VHT Compressed Beamforming Report and wherein when the indicator indicates the NDP response required, the first response frame is one of a VHT NDP and HE NDP; and sending, by the network device, the first sounding frame to a set of stations in the WLAN, including the first station, wherein the sounding feedback sequence initiates with the sending of the first sounding frame.

2. The method of claim 1, wherein the first sounding frame is a VHT NDP announcement frame or HE NDP announcement frame.

3. The method of claim 1, wherein the field is in a sounding dialog token in the first sounding frame.

4. The method of claim 1, further comprising:
generating a second sounding frame to request a second station, which was addressed by the first sounding frame, to send a second response frame, where the second sounding frame is a BF report poll including the indicator to request the second response frame to enable the network device to compute a second steering matrix or a second compressed beamforming report.

5. The method of claim 1, further comprising:
receiving the first response frame from the first station in the set of stations, where the first response frame is a response to the first sounding frame sent by the network device; and
generating the first steering matrix or the first compressed beamforming report from the first response frame.

6. The method of claim 5, wherein the network device is the beamformee and the first station is the beamformer.

7. A method implemented by a first network device functioning in a wireless local area network (WLAN), the method to improve efficiency for beamforming for multiple antenna array communications where a steering matrix or compressed beamforming report is determined by a second network device operating in the WLAN using implicit feedback from at least the first network device, where explicit feedback is channel characteristics calculated and provided by the first network device based on frames received from the second network device and where implicit feedback is channel characteristics calculated by the second network device using a response frame from the first network device, the steering matrix or the compressed beamforming report to determine a spatial path for transmission from a beamformer to each beamformee in the WLAN, the method comprising:
receiving, by the first network device, a first sounding frame that initiates a sounding feedback sequence between the second network device and at least the first network device, wherein the sounding feedback sequence is initiated with a sending of the first sounding frame by the second network device, the first sounding frame including an indicator to request a response frame from which the second network device can derive a steering matrix or a compressed beamforming report;
determining, based on the indicator, a type of the response frame, wherein the indicator is a field that indicates either null data packet (NDP) response allowed or NDP response required, wherein when the indicator indicates the NDP response allowed, the response frame is one of a Very High Throughput (VHT) NDP, a High Efficiency (HE) NDP or a VHT Compressed Beamforming Report;

generating the response frame indicated by the indicator in the first sounding frame; and
sending the response frame to the second network device.

8. The method of claim 7, wherein the received first sounding frame is a VHT NDP announcement frame or HE NDP announcement frame.

9. The method of claim 7, wherein the received first sounding frame is a BF report poll.

10. The method of claim 7, wherein generating the response frame comprises: generating an VHT NDP or HE NDP as the response frame, where the indicator is the NDP response required.

11. The method of claim 7, wherein generating the response frame comprises:
receiving a second sounding frame, where the second sounding frame is an NDP frame; and
generating the VHT compressed BF report as the response frame based on the second sounding frame when the indicator is the NDP response allowed.

12. The method of claim 7, wherein the second network device is the beamformee and the first network device is the beamformer.

13. The method of claim 7, wherein the field is in a sounding dialog token.

14. A network device functioning in a wireless local area network (WLAN), the network device improves efficiency for beamforming for multiple antenna array communications where a steering matrix or compressed beamforming report is determined by the network device using implicit feedback from at least one station in the WLAN, where explicit feedback is channel characteristics calculated and provided by the at least one station and where implicit feedback is channel characteristics calculated by the network device using a response frame from the at least one station, the steering matrix to determine a spatial path for transmission from a beamformer to each beamformee in the WLAN, the network device comprising:
a physical processor to implement physical layer data processing; and
a high efficiency (HE) sounding module coupled to the physical processor, the HE sounding module configured to generate a first sounding frame to initiate a sounding feedback sequence, the first sounding frame including an indicator to request a first response frame from a first station to enable the beamformer to compute a first steering matrix or a first compressed beamforming report, wherein the indicator indicates either null data packet (NDP) response allowed or NDP response required, and to sending, by the network device, the first sounding frame to a set of stations in the WLAN, including the first station, wherein the sounding feedback sequence initiates with the sending of the first sounding frame,
wherein when the indicator indicates the NDP response allowed, the first response frame is one of a Very High Throughput (VHT) NDP, a HE NDP or a VHT Compressed BF Report, and
wherein when the indicator indicates the NDP response required, the first response frame is one of a VHT NDP and HE NDP.

15. The network device of claim 14, wherein the first sounding frame is a VHT NDP announcement frame or HE NDP announcement frame.

16. The network device of claim 14, wherein the HE sounding module is further configured to generate a second sounding frame to request a second station, which was addressed by the first sounding frame, to send a second response frame, where the second sounding frame is a BF report poll including the indicator to request the second response frame to enable the beamformer to compute a second steering matrix or a second compressed beamforming report.

* * * * *